(12) United States Patent
Ujimaru et al.

(10) Patent No.: US 11,502,620 B2
(45) Date of Patent: Nov. 15, 2022

(54) VOLTAGE SUPPLY SYSTEM AND POWER SOURCE CONSTITUTING SAME

(71) Applicant: SUMITOMO ELECTRIC INDUSTRIES, LTD., Osaka (JP)

(72) Inventors: Tomoaki Ujimaru, Osaka (JP); Seiji Takahashi, Osaka (JP); Takaaki Sano, Osaka (JP); Takumi Uemura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/279,304

(22) PCT Filed: May 31, 2019

(86) PCT No.: PCT/JP2019/021850
§ 371 (c)(1),
(2) Date: Mar. 24, 2021

(87) PCT Pub. No.: WO2020/084822
PCT Pub. Date: Apr. 30, 2020

(65) Prior Publication Data
US 2021/0399650 A1    Dec. 23, 2021

(30) Foreign Application Priority Data
Oct. 26, 2018    (JP) .............................. JP2018-201685

(51) Int. Cl.
*H02M 3/00*    (2006.01)
*H02M 7/5387*    (2007.01)
(Continued)

(52) U.S. Cl.
CPC ....... *H02M 7/5387* (2013.01); *H02M 1/0032* (2021.05); *H02M 1/36* (2013.01);
(Continued)

(58) Field of Classification Search
CPC combination set(s) only.
See application file for complete search history.

(56) References Cited

U.S. PATENT DOCUMENTS 6,225,708 B1 * 5/2001 Furukawa ............... G06F 1/305
307/66
2006/0131961 A1 * 6/2006 Ishii ...................... H02M 3/158
307/31
(Continued)

FOREIGN PATENT DOCUMENTS

JP    2010-098862 A    4/2010
JP    2015-144534 A    8/2015
(Continued)

*Primary Examiner* — Gary A Nash
(74) *Attorney, Agent, or Firm* — Oliff PLC

(57) ABSTRACT

A voltage supply system and a power source that, in a voltage supply system in which a plurality of power sources (e.g., DC-DC converters) are connected in parallel, enable each power source to be set at a desired load ratio. The power source is used in a voltage supply system including a power source configured to output a voltage in a constant voltage mode on the basis of a first target voltage, and is connected in parallel to the constant voltage power source, the power source including a voltage generation unit configured to output a voltage switchably between a constant voltage mode based on a second target voltage greater than the first target voltage and a constant current mode based on a current limit value.

32 Claims, 23 Drawing Sheets

(51) Int. Cl.
*H02M 1/00* (2006.01)
*H02M 1/36* (2007.01)
*H02M 3/28* (2006.01)
*H02M 7/493* (2007.01)

(52) U.S. Cl.
CPC ............ *H02M 3/00* (2013.01); *H02M 3/285* (2013.01); *H02M 7/493* (2013.01); *H02M 1/008* (2021.05); *H02M 1/0074* (2021.05)

(56) References Cited

U.S. PATENT DOCUMENTS

| | | |
|---|---|---|
| 2011/0194319 A1 | 8/2011 | Ishioka |
| 2015/0061544 A1* | 3/2015 | Hamanaka ......... H05B 45/3725 |
| | | 315/307 |

FOREIGN PATENT DOCUMENTS

| | | | |
|---|---|---|---|
| JP | 2015144534 A | * | 8/2015 |
| JP | 2018-117454 A | | 7/2018 |

* cited by examiner

VOLTAGE SUPPLY SYSTEM AND POWER SOURCE CONSTITUTING SAME

TECHNICAL FIELD

This disclosure relates to a voltage supply system and a power source constituting the same. This application claims priority on Japanese Patent Application No. 2018-201685 filed on Oct. 26, 2018, the entire content of which is incorporated herein by reference.

BACKGROUND ART

In an electric vehicle, etc., a voltage of a high-voltage battery (e.g., DC 300 V) is converted to a low voltage (e.g., DC 14 V) by a DC-DC converter, to be supplied to a load. In a case where a required current of the load which is the voltage supply destination is great, the current capacity might be insufficient with one DC-DC converter. As a measure therefor, it is conceivable that a plurality of DC-DC converters are used so as to be connected in parallel.

For example, in a case where a plurality of DC-DC converters that are the same products are used so as to be connected in parallel, if loads (operation conditions) on all the DC-DC converters can be equalized, the lives of the plurality of DC-DC converters can be equalized. However, in actuality, the individual DC-DC converters have variations in output voltages even though the DC-DC converters are the same products. When a DC voltage conversion system having a plurality of DC-DC converters connected in parallel is started, the DC-DC converter having the greatest output voltage among the plurality of DC-DC converters is started first. The other DC-DC converters cannot perform outputs because their output voltages are small. During this period, power is supplied to the load only from the DC-DC converter having the greatest output voltage. Then, when the DC-DC converter having the greatest output voltage has reached the own maximum allowable current so that the current is limited, the DC-DC converter having the second greatest output voltage is started. Thus, since the plurality of DC-DC converters connected in parallel have variations in output voltages, merely connecting the DC-DC converters in parallel cannot equalize their loads. Therefore, there is a problem that a specific DC-DC converter deteriorates earlier than the other DC-DC converters and the life of the DC voltage supply system depends on the life of the specific DC-DC converter.

For solving the above problem, Patent Literature 1 discloses a DC voltage conversion device that can increase the life by equalizing the lives of DC-DC converters connected in parallel. In the DC voltage conversion device, a target value for the output voltage of one of the plurality of DC-DC converters connected in parallel is set to be greater than those of the other DC-DC converters, and a current limit value for limiting the output current thereof is set to be half the maximum load current. With this configuration, the load is distributed among the plurality of DC-DC converters connected in parallel, whereby the lives of the DC-DC converters can be equalized.

CITATION LIST

Patent Literature

PATENT LITERATURE 1: Japanese Laid-Open Patent Publication No. 2015-144534

SUMMARY OF INVENTION

Solution to Problem

A power source according to one aspect of this disclosure is a power source used in a voltage supply system including a constant voltage power source configured to output a voltage in a constant voltage mode on the basis of a first target voltage, the power source being electrically connected in parallel to the constant voltage power source, the power source including a voltage generation unit configured to output a voltage in a constant voltage mode based on a second target voltage greater than the first target voltage and a constant current mode based on a current limit value.

A voltage supply system according to another aspect of this disclosure is a voltage supply system including: a first power source configured to output a voltage in a constant voltage mode on the basis of a first target voltage; and a second power source electrically connected in parallel to the first power source, wherein the second power source includes a voltage generation unit configured to output a voltage in a constant voltage mode based on a second target voltage greater than the first target voltage and a constant current mode based on a current limit value.

Advantageous Effects of Invention

According to this disclosure, in a voltage supply system having a plurality of power sources (e.g., DC-DC converters or DC-AC converters) connected in parallel, each power source can be set at a desired load ratio. In addition, according to this disclosure, change in the output voltage of the voltage supply system due to change in the load current can be suppressed.

DESCRIPTION OF EMBODIMENTS

Figure 1:
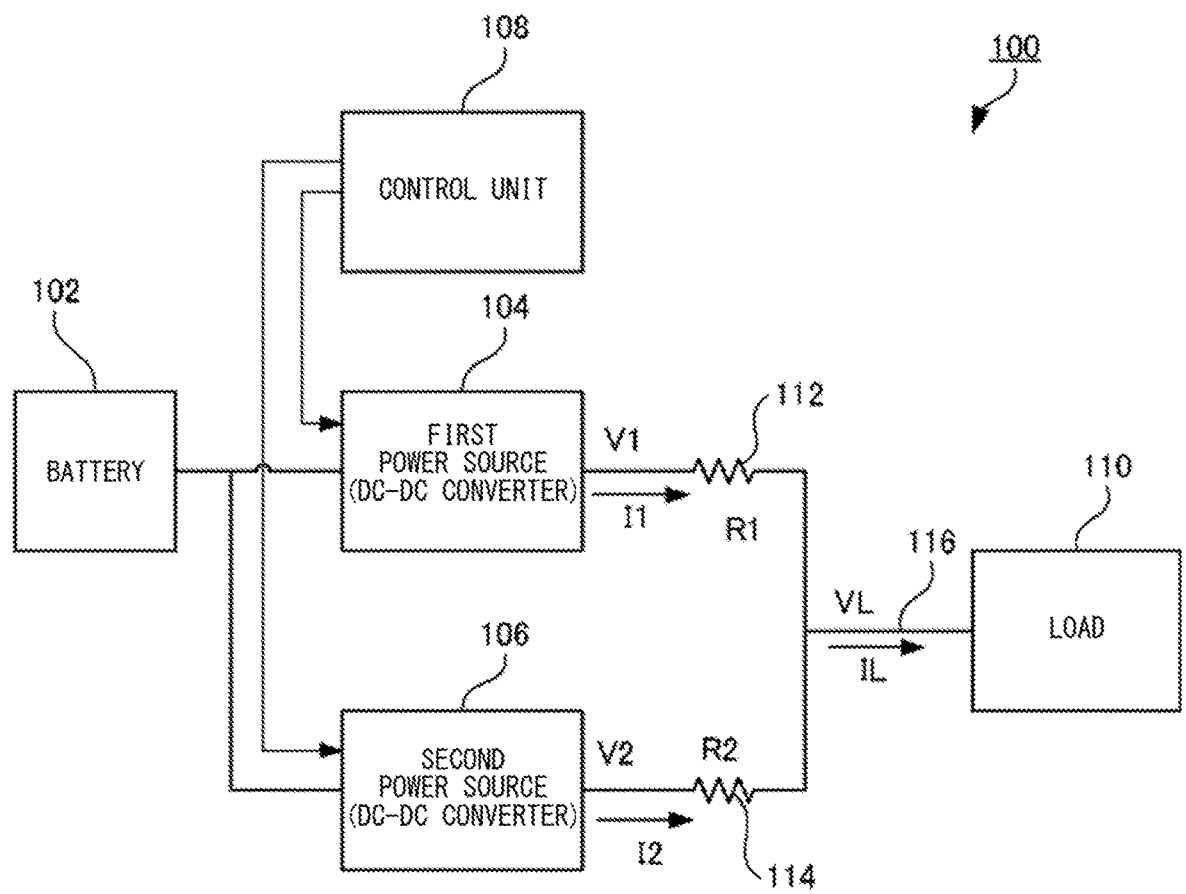
FIG. 1 is a block diagram showing the configuration of a DC voltage supply system according to an embodiment of this disclosure.

Problems to be Solved by this Disclosure

There is a case where DC-DC converters different in standard values are connected in parallel. In this case, rather than equalizing the ratio at which each DC-DC converter bears a current flowing to a load (hereinafter, may be referred to as load ratio) among all the DC-DC converters, it is desirable that the load ratio can be set for each DC-DC converter. In Patent Literature 1, the load ratios of the DC-DC converters connected in parallel cannot be set to desired values, and therefore the above demand cannot be met.

In addition, the DC voltage conversion device of Patent Literature 1 has a load current region in which only a master (DC-DC converter for which the output voltage target value is great) operates, and a load current region in which the master and a slave operate, in accordance with change in the load current. Thus, there is a problem that voltage change occurs at the time of switching between the regions. Such a problem is not limited to the case where the input and the output are both DC. The same problem arises also in a case where one or both of the input and the output are AC, for example.

Accordingly, an object of this disclosure is to provide a voltage supply system and a power source that, in a voltage supply system in which a plurality of power sources (e.g., DC-DC converters) each performing power conversion are connected in parallel, enable each power source to be set at a desired load ratio. In addition, an object of this disclosure is to provide a voltage supply system and a power source that, in a voltage supply system in which a plurality of power sources are connected in parallel, enable suppression of change in the output voltage of the voltage supply system due to change in the load current.

[Description of Embodiments of this Disclosure]

First, contents of embodiments of this disclosure are listed and described. At least some parts of the embodiments described below may be combined together as desired.

(1) A power source according to a first aspect of this disclosure is a power source used in a voltage supply system including a constant voltage power source configured to output a voltage in a constant voltage mode on the basis of a first target voltage, the power source being connected in parallel to the constant voltage power source, the power source including a voltage generation unit configured to output a voltage switchably between a constant voltage mode based on a second target voltage greater than the first target voltage and a constant current mode based on a current limit value. Thus, the power source and the constant voltage power source can be both operated. By changing the current limit value, the power source and the constant voltage power source can be operated at desired load ratios.

(2) Preferably, the power source further includes a delay unit configured to delay start of power conversion in the power source until the constant voltage power source starts power conversion. Thus, the output voltage of the voltage supply system can be determined by the output voltage of the constant voltage power source. In addition, since the second target voltage is greater than the first target voltage, the power source starts power conversion after the constant voltage power source starts power conversion, and thus can operate together with the constant voltage power source. As a result, voltage increase in the power source at the time of starting can be suppressed.

(3) Preferably, the delay unit includes a delayed starting unit configured to start power conversion in the power source with a delay of a predetermined period after the voltage supply system is started. Thus, the output voltage of the voltage supply system can be determined by the output voltage of the constant voltage power source. In addition, since the second target voltage is greater than the first target voltage, the power source starts after the predetermined period and thus can operate together with the constant voltage power source. As a result, voltage increase in the power source at the time of starting can be suppressed.

(4) More preferably, the delayed starting unit includes a timer configured to detect that the predetermined period has elapsed after the voltage supply system is started, an operation prohibition unit configured to prohibit operation of the power source in response to a fact that the voltage supply system is started, and a starting unit configured to, in response to a fact that the timer has detected elapse of the predetermined period, disable the operation prohibition unit and start power conversion in the power source. Since start of the power source is prohibited until the predetermined period elapses after the voltage supply system is started, the output voltage of the voltage supply system is determined by the output voltage of the constant voltage power source. In addition, since the second target voltage is greater than the first target voltage, when prohibition of start of the power source is canceled after the predetermined period, the power source starts power conversion and thus can operate together with the constant voltage power source.

(5) Further preferably, the operation prohibition unit includes a first current setting unit configured to set the current limit value at 0 in response to a fact that the voltage supply system is started, and the starting unit includes a second current setting unit configured to set the current limit value to a predetermined value greater than 0 in response to a fact that the timer has detected elapse of the predetermined period. Since the current limit value for the power source is set at 0, during the predetermined period from the start of the voltage supply system, no current is outputted from the power source, and the power source does not operate. When the predetermined period has elapsed, the current limit value is set at a predetermined value greater than 0. By appropriately setting the predetermined period, voltage change at the start of the voltage supply system is prevented, and after the predetermined period has elapsed, the power source operates together with the constant voltage power source, so that the respective power sources can bear load currents.

(6) Preferably, the second current setting unit includes a limit value setting unit configured to set the current limit value at a value between a predetermined lower limit value and an upper limit value prescribed by a current value of a current being supplied from the voltage supply system. Since the current outputted from the second current setting unit is limited between the current value of the voltage supply system and the predetermined lower limit value, the power source operates together with the constant voltage power source, so that the respective power sources can bear load currents.

(7) More preferably, the limit value setting unit includes a current limit value determining unit configured to determine the current limit value to be a value obtained by multiplying the current value of the current being supplied from the voltage supply system by a value that is not smaller than 0 and not greater than 1. Thus, once the power source has begun to operate in the constant current mode, the power source can be inhibited from operating in the constant voltage mode, whereby change in the voltage supplied from the voltage supply system can be suppressed. In addition, the set load ratio can be kept, even when the current supplied from the voltage supply system to the load has changed.

(8) Further preferably, the limit value setting unit includes a setting unit configured to set the current limit value so that a ratio of the current limit value to the current value of the current being supplied from the voltage supply system becomes equal to a predetermined target value that is not smaller than 0 and is smaller than 1. Thus, once the power source has begun to operate in the constant current mode, the power source can be inhibited from operating in the constant voltage mode, whereby change in the voltage supplied from the voltage supply system can be suppressed. In addition, the set load ratio can be kept, even when the current supplied from the voltage supply system to the load has changed.

(9) Further preferably, the second current setting unit includes a current value reception unit configured to receive, from the constant voltage power source, a value indicating a current value of a current being outputted from the constant voltage power source, and a limit value setting unit configured to set the current limit value so that a ratio of the current limit value to a sum of the current value indicated by the value received by the current value reception unit and a current value of a current being outputted from the power source becomes a predetermined target value that is not smaller than 0 and is smaller than 1. Using the current value of the current being outputted from the constant voltage power source, the current limit value for the power source is set so that the ratio of the current limit value to the sum of the current value and the output current value of the power source becomes a target value that is not smaller than 0 and is smaller than 1. As a result, the power source bears a part of the current to be supplied from the voltage supply system, and the constant voltage power source bears the remaining current. Such an operation that only one of the power source and the constant voltage power source bears the current is not performed, and voltage change due to such an operation can be avoided.

(10) Preferably, the limit value setting unit includes a current value calculation unit configured to calculate the current value of the current being outputted from the constant voltage power source by a predetermined conversion expression with respect to the value received by the current value reception unit, and a current limiting unit configured to set the current limit value so that a ratio of the current limit value to a sum of the current value calculated by the current value calculation unit and the output current value of the power source becomes the target value. Even in a case where the value received by the reception unit is not a value directly indicating the current being outputted from the constant voltage power source, the current being outputted from the constant voltage power source can be estimated by the current calculation unit performing predetermined conversion. On the basis of the estimation result, the current limit value for the power source is set so that the ratio of the estimated value and the output current value of the power source becomes a target value that is not smaller than 0 and is smaller than 1. As a result, the power source bears a part of the current to be supplied from the voltage supply system, and the constant voltage power source bears the remaining current. Such an operation that only one of the power source and the constant voltage power source bears the current is not performed, and voltage change due to such an operation can be avoided.

(11) Preferably, the target value is a ratio of a rated output current of the power source to a sum of a rated output current of the constant voltage power source and the rated output current of the power source.

(12) Further preferably, the second target voltage is a value not smaller than an upper limit of variation in the voltage outputted from the constant voltage power source on the basis of the first target voltage. Thus, the power source can be assuredly started. As a result, the DC power source and the constant voltage power source can be easily both operated.

(13) Preferably, the second target voltage is a value equal to an upper limit of variation in the voltage outputted from the constant voltage power source on the basis of the first target voltage. Thus, the power source can be started. As a result, the power source and the constant voltage power source can be easily both operated. In addition, it is possible to minimize increase in the output voltage of the voltage supply system caused when the load current has become smaller than the current limit value.

(14) The variation is a value determined by specifications of the constant voltage power source. The current limit value can be easily set by using the specifications of the constant voltage power source. As a result, the power source and the constant voltage power source can be easily both operated. It is possible to minimize change in the output voltage of the voltage supply system caused when the load current has become smaller than the current limit value.

(15) More preferably, the power source further includes a current value reception unit configured to receive a signal indicating a current value of a current being supplied from the voltage supply system, wherein the second current setting unit includes a current limit value setting unit configured to set the current limit value at a value between a predetermined lower limit value and the current value indicated by the signal received by the current value reception unit. Since the current limit value can be made smaller than the current value of the current being supplied from the voltage supply system, the current value of the current being supplied from the voltage supply system can be allocated between the constant voltage power source and the power source. As a result, a state in which only the power source bears the current does not occur, and it is possible to prevent occurrence of voltage change from the output voltage of the constant voltage power source to the output voltage of the power source.

(16) Further preferably, the power source further includes a current sensor configured to detect the current value of the current being supplied from the voltage supply system to a load, wherein the current value reception unit receives the signal indicating the current value from the current sensor. Since the current limit value can be made smaller than the current value of the current being supplied from the voltage supply system, the current value of the current being supplied from the voltage supply system can be allocated between the constant voltage power source and the power source. As a result, a state in which only the power source bears the current does not occur, and it is possible to prevent occurrence of voltage change from the output voltage of the constant voltage power source to the output voltage of the power source.

(17) Preferably, the voltage supply system further includes a current sensor configured to measure the current value of the current being supplied from the voltage supply system to a load, and a control unit configured to supply a signal indicating the current value measured by the current sensor, to the current value reception unit, and the current value reception unit receives the signal from the control unit. Since the current limit value can be made smaller than the current value of the current being supplied from the voltage supply system, the current value of the current being supplied from the voltage supply system can be allocated between the constant voltage power source and the power source. As a result, a state in which only the power source bears the current does not occur, and it is possible to prevent occurrence of voltage change from the output voltage of the constant voltage power source to the output voltage of the power source.

(18) More preferably, the power source further includes a current value reception unit configured to receive a current value of a current being outputted from the constant voltage power source, wherein the second current setting unit includes a current limit value setting unit configured to set the current limit value so that a ratio of the current limit value to the current value received by the current value reception unit becomes a predetermined target value. Since the current limit value can be made smaller than the current value of the current being supplied from the voltage supply system, the current value of the current being supplied from the voltage supply system can be allocated between the constant voltage power source and the power source. As a result, a state in which only the power source bears the current does not occur, and it is possible to prevent occurrence of voltage change from the output voltage of the constant voltage power source to the output voltage of the power source.

(19) Further preferably, the voltage supply system further includes: a current sensor configured to measure the current value of the current being outputted from the constant voltage power source; and a control unit configured to output a signal indicating the current value measured by the current sensor, wherein the current value reception unit receives the signal from the control unit. Since the current limit value can be made smaller than the current value of the current being supplied from the voltage supply system, the current value of the current being supplied from the voltage supply system can be allocated between the constant voltage power source and the power source. As a result, a state in which only the power source bears the current does not occur, and it is possible to prevent occurrence of voltage change from the output voltage of the constant voltage power source to the output voltage of the power source.

(20) Preferably, the power source further includes a current sensor configured to measure the current value of the current being outputted from the constant voltage power source, wherein the current value reception unit receives the current value from the current sensor. Since the current limit value can be determined on the basis of the current value of the current being outputted from the constant voltage power source, the current value of the current being supplied from the voltage supply system can be allocated between the constant voltage power source and the power source. As a result, a state in which only the power source bears the current does not occur, and it is possible to prevent occurrence of voltage change from the output voltage of the constant voltage power source to the output voltage of the power source.

(21) More preferably, the operation prohibition unit includes a drive signal stop unit configured to stop output of a drive signal to the voltage generation unit in response to a fact that the voltage supply system is started, and the starting unit includes a drive signal output unit configured to start output of the drive signal to the voltage generation unit in response to a fact that the timer has detected elapse of the predetermined period. The drive signal to the voltage generation unit is stopped until the predetermined period elapses, and thereafter, the voltage generation unit is driven to start power conversion. Thus, the power source and the constant voltage power source can be both operated. By changing the current limit value, the power source and the constant voltage power source can be operated at desired load ratios.

(22) Further preferably, the delayed starting unit includes a timer configured to detect that the predetermined period has elapsed after the voltage supply system is started, a drive signal output stop unit configured to stop output of a drive signal to the voltage generation unit in response to a fact that the voltage supply system is started, and a starting unit configured to start power conversion in the power source by disabling the drive signal output stop unit in response to a fact that the timer has detected elapse of the predetermined period. The drive signal to the voltage generation unit is stopped until the predetermined period elapses, and thereafter, the voltage generation unit is driven to start power conversion. Thus, the power source and the constant voltage power source can be both operated. By changing the current limit value, the power source and the constant voltage power source can be operated at desired load ratios.

(23) Preferably, the delay unit includes a delayed starting unit configured to start power conversion in the power source in response to a fact that power conversion in the constant voltage power source is started. Power conversion in the power source is started after power conversion in the constant voltage power source is started. Thus, the power source can be started as well, so that the power source and the constant voltage power source can be both operated. By changing the current limit value, the power source and the constant voltage power source can be operated at desired load ratios.

(24) More preferably, the delayed starting unit starts power conversion in the power source in response to at least one of a fact that the output voltage of the constant voltage power source has reached the first target voltage and a fact that information indicating that power conversion is started is received from the constant voltage power source. When the constant voltage power source has started power conversion, the output voltage reaches the first target voltage. Also, information indicating that the constant voltage power source has started power conversion can be received from the constant voltage power source. In any case, power conversion in the power source is started after power conversion in the constant voltage power source is started. Thus, the power source can be started as well, so that the power source and the constant voltage power source can be both operated. By changing the current limit value, the power source and the constant voltage power source can be operated at desired load ratios.

(25) More preferably, the power source further includes a target voltage replacement unit configured to replace the second target voltage with a voltage being outputted from the power source, in response to a fact that the voltage generation unit has begun to output the voltage in the constant current mode, after the voltage supply system is started. Thus, it is possible to further reduce the width of change in the voltage supplied from the voltage supply system, which is caused by the power source operating in the constant voltage mode.

(26) Further preferably, the power source further includes: a state detection unit configured to detect an operation state of the power source; and a limiting unit configured to limit operation of the power source in response to a fact that the state detection unit has detected that the power source is operating in the constant voltage mode. The fact that the power source is operating in the constant voltage mode means that the constant voltage power source is not outputting a current. In such a case, by limiting operation of the power source, the constant voltage power source can be operated together with the power source, and the change width of the voltage supplied from the voltage supply system can be reduced.

(27) Preferably, the state detection unit detects whether or not the power source is operating in the constant voltage mode, on the basis of whether or not the output voltage of the power source has reached the second target voltage. The fact that the output voltage of the power source has reached the second target voltage means that the power source is operating in the constant voltage mode. This means that the constant voltage power source is not outputting a current. In such a case, by limiting operation of the power source, the constant voltage power source can be operated together with the power source, and the change width of the voltage supplied from the voltage supply system can be reduced.

(28) More preferably, the limiting unit decreases the current limit value to a value not smaller than 0, in response to a fact that the state detection unit has detected that the power source is operating in the constant voltage mode. Thus, even if the load current has sharply changed to be smaller than the current limit value, the power source can keep operation in the constant current mode. As a result, increase in the output voltage of the voltage supply system can be suppressed.

(29) Preferably, the power source further includes a measurement unit configured to measure an output current of the power source, wherein the current limit value is decreased to a value not smaller than 0, in response to a fact that the output current measured by the measurement unit has become smaller than the current limit value. Thus, even if the load current has sharply changed to be smaller than the current limit value, the power source can keep operation in the constant current mode. As a result, increase in the output voltage of the voltage supply system can be suppressed.

(30) More preferably, the power source further includes a determination unit configured to determine whether or not the constant voltage power source is stopped, and in response to a fact that the determination unit has determined that the constant voltage power source is stopped, the power supply replaces the second target voltage with the first target voltage and replaces the current limit value with a rated maximum current value of the power source. Thus, even when the constant voltage power source is stopped, increase in the output voltage of the voltage supply system can be suppressed.

(31) Preferably, the constant voltage power source includes a DC constant voltage power source configured to output a DC voltage in the constant voltage mode on the basis of the first target voltage, and the power source includes a DC voltage generation unit configured to output a DC voltage switchably between the constant voltage mode based on the second target voltage greater than the first target voltage, and the constant current mode based on the current limit value. The DC power source and the DC constant voltage power source can be both operated. By changing the current limit value, the DC power source and the DC constant voltage power source can be operated at desired load ratios, to output load currents.

(32) More preferably, the constant voltage power source includes an AC constant voltage power source configured to output an AC voltage in the constant voltage mode on the basis of the first target voltage, and the power source includes an AC voltage generation unit configured to output an AC voltage switchably between the constant voltage mode based on the second target voltage greater than the first target voltage, and the constant current mode based on the current limit value. The AC power source and the AC constant voltage power source can be both operated. By changing the current limit value, the AC power source and the AC constant voltage power source can be operated at desired load ratios, to output load currents.

(33) A DC voltage supply system according to a second aspect of this disclosure includes: a first power source configured to output a voltage in a constant voltage mode on the basis of a first target voltage; and a second power source connected in parallel to the first power source, wherein the second power source includes a voltage generation unit configured to output a voltage switchably between a constant voltage mode based on a second target voltage greater than the first target voltage and a constant current mode based on a current limit value. Thus, the first power source and the second power source can be both operated. Further, by changing the predetermined value, the first power source and the second power source can be operated at desired load ratios.

[Details of Embodiments of this Disclosure]

In the following embodiments, the same parts are denoted by the same reference characters. The names and functions of such parts are also the same. Therefore, those parts will not be repeatedly described in detail.

First Embodiment

[Entire Configuration]

With reference to FIG. 1, a DC voltage supply system 100 according to the first embodiment of this disclosure includes a battery 102, a first power source 104, a second power source 106, and a control unit 108. The DC voltage supply system 100 is, for example, used for an electric vehicle or the like, and supplies a constant DC voltage to a load 110. The battery 102 is a battery (e.g., secondary battery) that supplies a high voltage (e.g., 300 V). The first power source 104 and the second power source 106 are connected in parallel. That is, positive input terminals of the first power source 104 and the second power source 106 are connected to each other, and positive output terminals of the first power source 104 and the second power source 106 are connected to each other. A parasitic resistance 112 and a parasitic resistance 114 represent substantial resistances (resistance of an electric wire, resistance of a connection portion, etc.) on wires. As used herein, the "connection" refers to electric connection.

The positive terminal of the battery 102 is connected to the commonly connected positive input terminals of the first power source 104 and the second power source 106. The commonly connected position output terminals of the first power source 104 and the second power source 106 form a connection node 116 which is a voltage supply end from the DC voltage supply system 100 to the load 110. The negative side of each part is grounded.

When an output current (value I1) of the first power source 104 flows through the parasitic resistance 112, a voltage drop by I1×R1 occurs. Similarly, when an output current (value I2) of the second power source 106 flows through the parasitic resistance 114, a voltage drop by I2×R2 occurs. A voltage VL at the connection node 116 becomes a value smaller than the output voltage V1 of the first power source 104 by the voltage drop of I1×R1. Also, the output voltage VL becomes a value smaller than the output voltage V2 of the second power source 106 by the voltage drop of I2×R2. Both values are equal to each other, and therefore the following expression is satisfied.

$$VL = V1 - I1 \times R1 = V2 - I2 \times R2$$

A current value IL of a current supplied from the DC voltage supply system 100 is the sum of the output current value I1 of the first power source 104 and the output current value I2 of the second power source 106 (IL=I1+I2).

The first power source 104 and the second power source 106 are DC-DC converters. The first power source 104 and the second power source 106 convert a DC voltage inputted from the battery 102, to predetermined output voltages V1 and V2, respectively, and output the output voltages V1 and V2 from the output terminals. The first power source 104 operates by constant voltage (CV) control so as to output a designated constant output voltage V1 (hereinafter, may be referred to as constant voltage mode). The second power source 106 operates by constant voltage constant current (CVCC) control, and thus, in addition to operation in the constant voltage mode, can perform output at a designated constant current value I2 by constant current (CC) control (hereinafter, may be referred to as constant current mode), that is, the second power source 106 can operate switchably between the constant voltage mode and the constant current mode.

Figure 2:
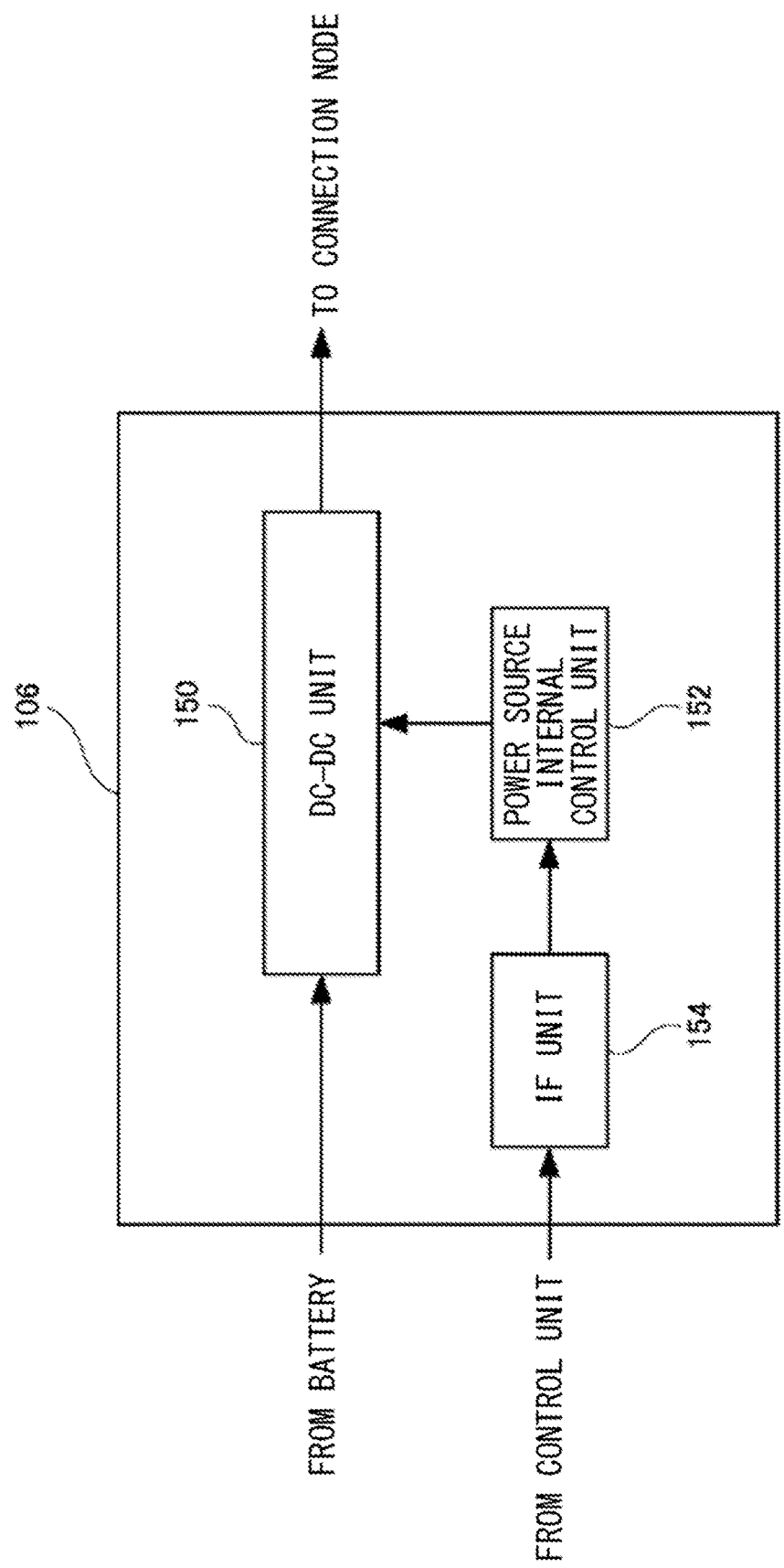
FIG. 2 is a block diagram showing the configuration of a second power source in FIG. 1.

With reference to FIG. 2, the second power source 106 includes: a DC-DC unit 150 capable of operating switchably between the constant voltage mode based on a target value for an output voltage in the constant voltage mode (hereinafter, referred to as second target voltage), which is greater than a target value for the output voltage of the first power source 104 (hereinafter, referred to as "first target voltage"), and the constant current mode based on a current limit value; a power source internal control unit 152; and an IF unit 154. The DC-DC unit 150 functions as a voltage generation unit for generating an output voltage of the second power source 106, and as described above, operates in the constant voltage mode or the constant current mode by CVCC control, converts the DC voltage inputted from the battery 102, to a predetermined voltage, and outputs the converted voltage to the connection node 116. The IF unit 154 receives data transmitted from the control unit 108 and inputs the data to the power source internal control unit 152. The power source internal control unit 152 is, for example, a microcomputer including an internal memory. The internal memory has stored therein a program to be executed by the power source internal control unit 152, necessary parameters, and the like. The power source internal control unit 152 calculates a setting value needed for operation of the DC-DC unit 150 on the basis of the data received from the IF unit 154, and sets the setting value for the DC-DC unit 150.

Figure 3:
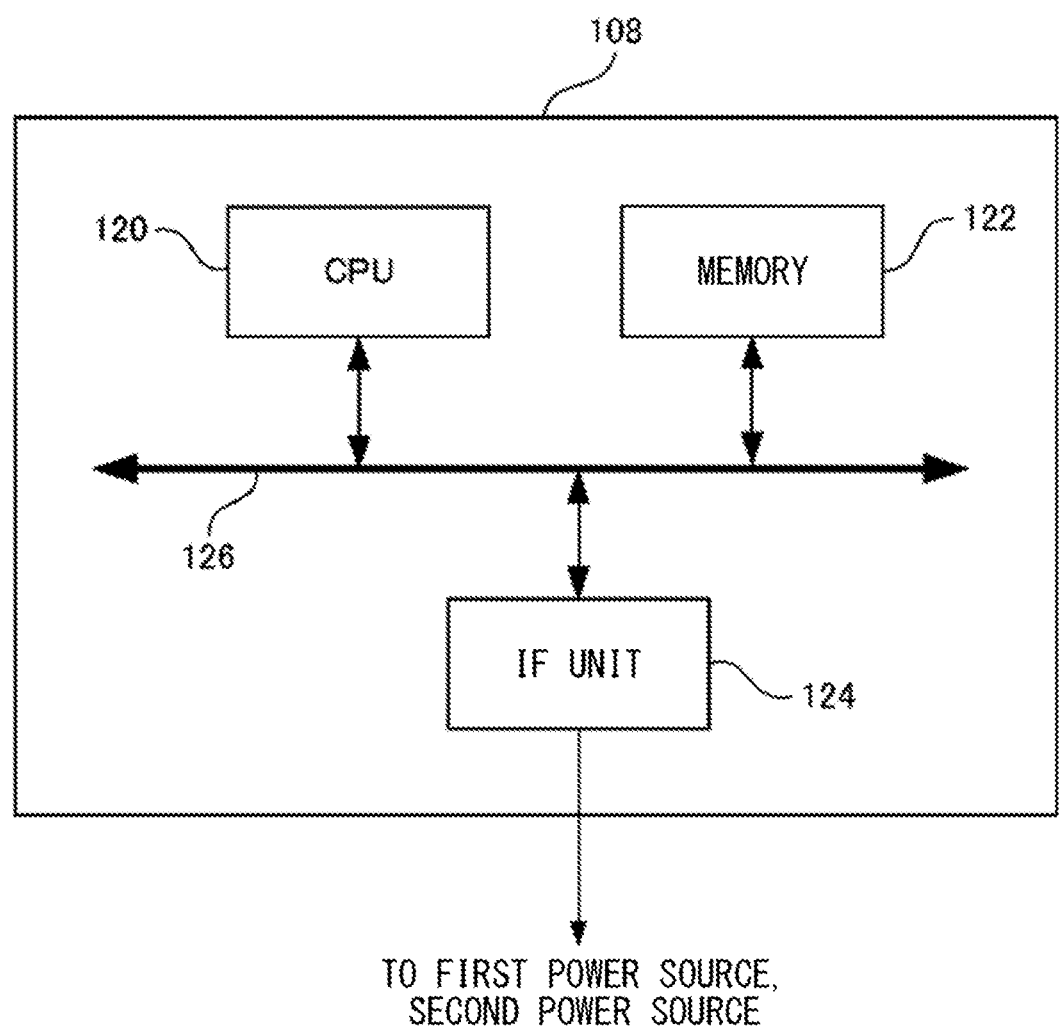
FIG. 3 is a block diagram showing the configuration of a control unit in FIG. 1.

With reference to FIG. 3, the control unit 108 includes a central processing unit (CPU) 120, a memory 122, an interface unit (hereinafter, referred to as IF unit) 124, and a bus 126. Data transmission between the parts is performed via the bus 126. The memory 122 is, for example, a rewritable semiconductor nonvolatile memory or the like. The memory 122 has stored therein a program to be executed by the CPU 120, predetermined parameters, and the like. A part of the area of the memory 122 is used as a working area when the CPU 120 executes the program. The control unit 108 is, for example, an electronic control unit (ECU) of the electric vehicle, or the like.

The CPU 120 controls operations of the first power source 104 and the second power source 106. That is, the CPU 120 transmits the first target voltage to the first power source 104 via the IF unit 124. In addition, the CPU 120 transmits the second target voltage and a limit value for the output current in the constant current mode (hereinafter, may be referred to as current limit value) to the second power source 106 via the IF unit 124. Thus, as described above, the first power source 104 operates in the constant voltage mode, to output a voltage equal to the first target voltage. In addition, as described above, the second power source 106 outputs a current equal to the current limit value when operating in the constant current mode, and outputs a voltage equal to the second target voltage when operating in the constant voltage mode.

[Operation of DC Voltage Supply System]

Figure 4:
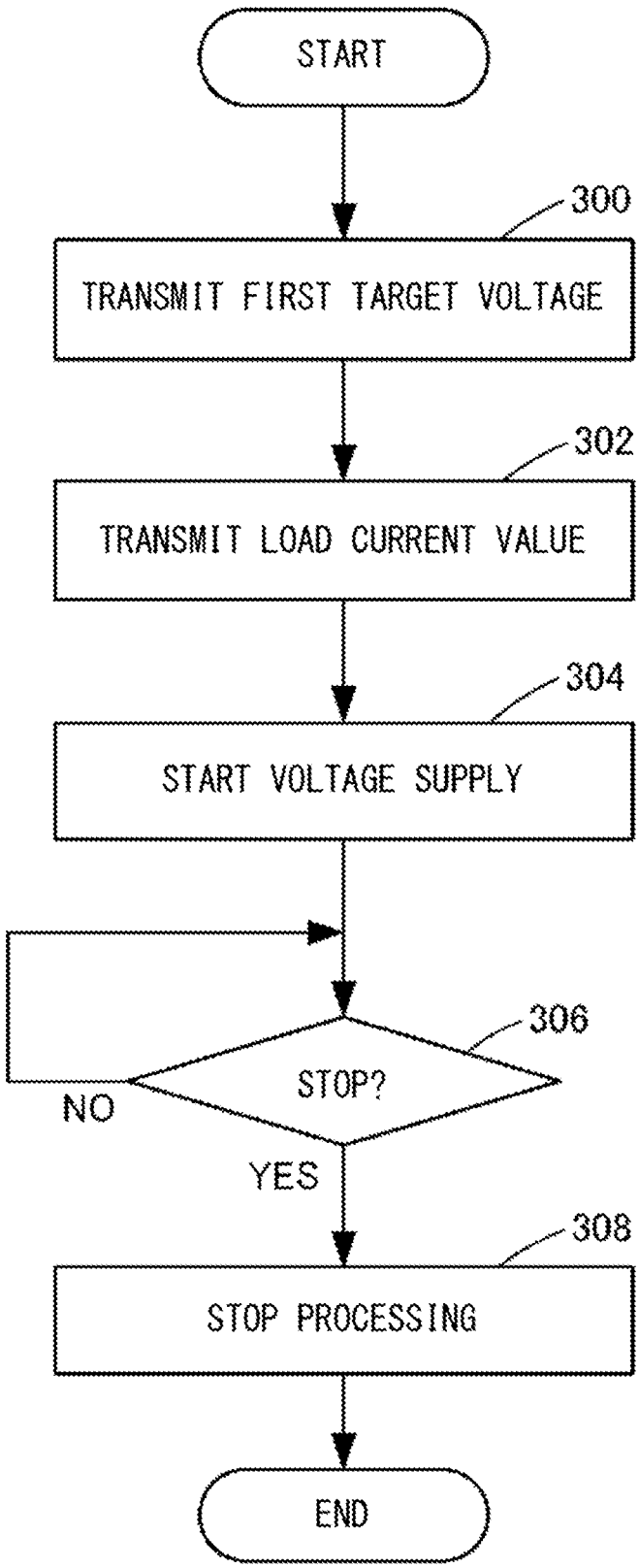
FIG. 4 is a flowchart showing control of the control unit in the DC voltage supply system in FIG. 1.
Figure 5:
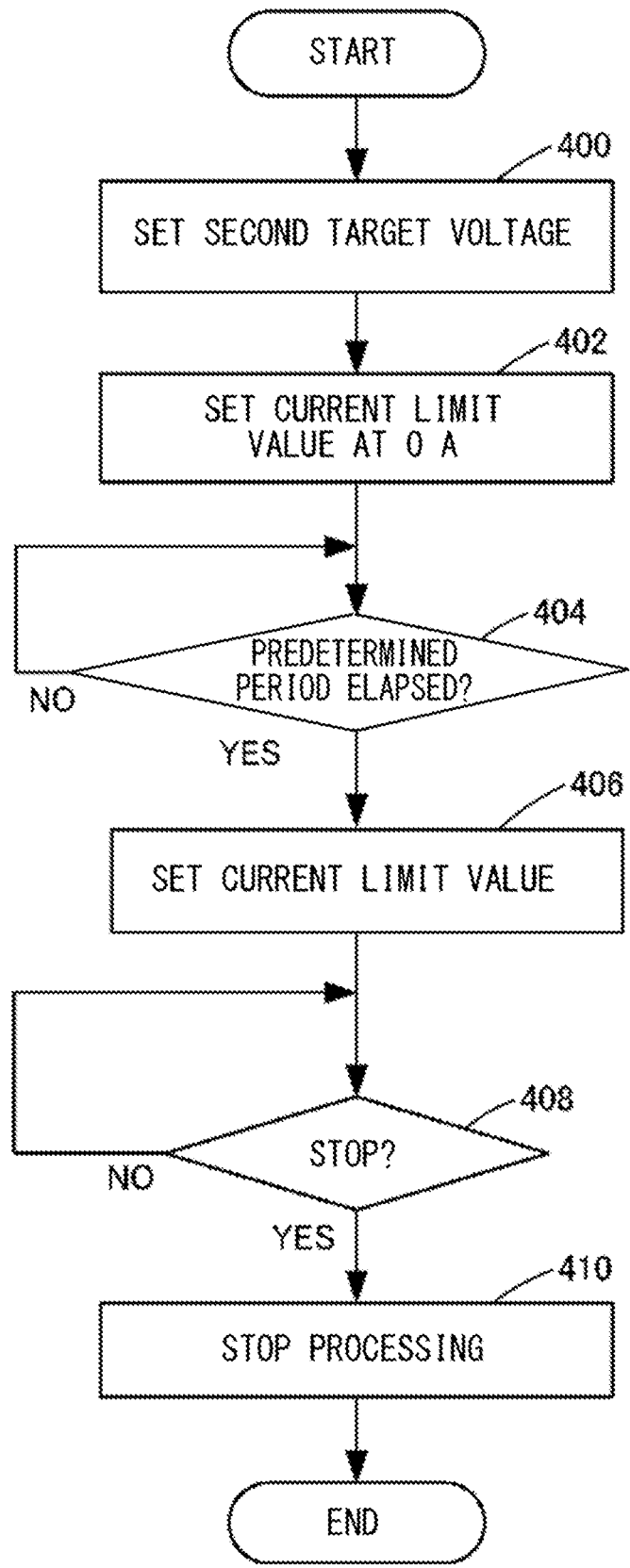
FIG. 5 is a flowchart showing control of the second power source in the DC voltage supply system in FIG. 1.

With reference to FIG. 4 and FIG. 5, voltage supply operation of the DC voltage supply system 100 will be described. The process shown in FIG. 4 is implemented by the CPU 120 reading a predetermined program from the memory 122 and executing the same.

In step 300, the target voltage for the first power source 104 is transmitted. Specifically, the CPU 120 reads the first target voltage designated for the first power source 104, from the memory 122, and transmits the first target voltage to the first power source 104 and the second power source 106 via the IF unit 124. The first power source 104 and the second power source 106 each store the received first target voltage in an internal memory, for example.

In step 302, a load current value is transmitted. Specifically, the CPU 120 transmits, to the second power source 106, the current value of a current to be supplied from the DC voltage supply system 100 to the load 110.

In step 304, voltage supply to the load 110 is started. For example, the CPU 120 transmits a start instruction for starting an output, to the first power source 104 and the second power source 106 via the IF unit 124, whereby power is started to be supplied from the output terminals of the first power source 104 and the second power source 106.

In step 306, whether or not an instruction to stop the DC voltage supply system 100 is received, is determined. The stop instruction is carried out by turning off an apparatus (electric vehicle, etc.) to which the DC voltage supply system 100 is mounted, for example. If it is determined that the stop instruction is received, the control proceeds to step 308. Otherwise, step 306 is repeated.

In step 308, stop processing is performed. For example, the CPU 120 transmits stop instructions to stop the outputs, to the first power source 104 and the second power source 106 via the IF unit 124. Then, the program is ended.

The process shown in FIG. 5 is implemented by the power source internal control unit 152 reading a predetermined program from the internal memory and executing the same. Here, it is assumed that the power source internal control unit 152 has received, via the IF unit 154, the first target voltage, the load current value, and the start instruction transmitted from the control unit 108 as described above.

In step 400, the second target voltage is set. Specifically, the power source internal control unit 152 determines the second target voltage from the first target voltage, and sets the second target voltage for the DC-DC unit 150. The second target voltage is set to be slightly greater than the first target voltage (the first target voltage and the second target voltage are both positive values).

In the present embodiment, the second power source 106 needs to be started with a delay from start of power conversion in the first power source 104. Therefore, in step 402, the power source internal control unit 152 sets 0 A (zero amperes) as the current limit value for the DC-DC unit 150, to prohibit operation of the DC-DC unit 150, and voltage output is started. Since the current limit value is set at 0, the second power source 106 does not operate and power supply to the load 110 is performed by the first power source 104. That is, a voltage equal to the first target voltage is outputted from the first power source 104, and a current is supplied to the load 110. The current needed for the load 110 is all supplied from the first power source 104. In the present embodiment, operation of the DC-DC unit 150 is prohibited by setting 0 A as the current limit value. However, this disclosure is not limited to such an embodiment. For example, while the power source internal control unit 152 performs processing of calculating a signal value for driving the DC-DC unit 150 by pulse width modulation (PWM), a PWM signal which is a drive signal therefor may not be outputted to the DC-DC unit 150.

In step 404, the power source internal control unit 152 determines whether or not a predetermined period has elapsed since the start of voltage output. If it is determined that the predetermined period has elapsed, the control proceeds to step 406. Otherwise, step 404 is repeated. The power source internal control unit 152 can determine elapse of the period, in a case of having a timer, by using the timer, or in a case of not having a timer, by counting of an operation clock.

In step 406, the power source internal control unit 152 determines a current limit value greater than 0, from the load current value received from the control unit 108, and sets the current limit value for the DC-DC unit 150. The current limit value is set in accordance with the load ratios of the first power source and the second power source. Thus, current supply from the second power source 106 to the load 110 is started, and accordingly, the current value I1 of the current supplied from the first power source 104 to the load 110 is decreased. The current value I2 of the current supplied from the second power source 106 is limited to the current limit value, and therefore, after having increased to the current limit value, the current value I2 becomes a value equal to the current limit value. Thus, the current value I1 of the current supplied from the first power source 104 to the load 110 becomes a value obtained by subtracting the current limit value for the second power source 106 from the current value IL of the current flowing through the load 110.

In step 408, the power source internal control unit 152 determines whether or not a stop instruction is received from the control unit 108. If it is determined that a stop instruction is received, the control proceeds step 410. Otherwise, step 408 is repeated.

In step 410, the power source internal control unit 152 stops the DC-DC unit 150.

As described above, in the DC voltage supply system 100, the first power source 104 and the second power source 106 can be both operated. As a result, load concentration in which a current is supplied to the load 110 only from one power source can be prevented, and current supply to the load 110 can be distributed between two power sources.

Figure 6:
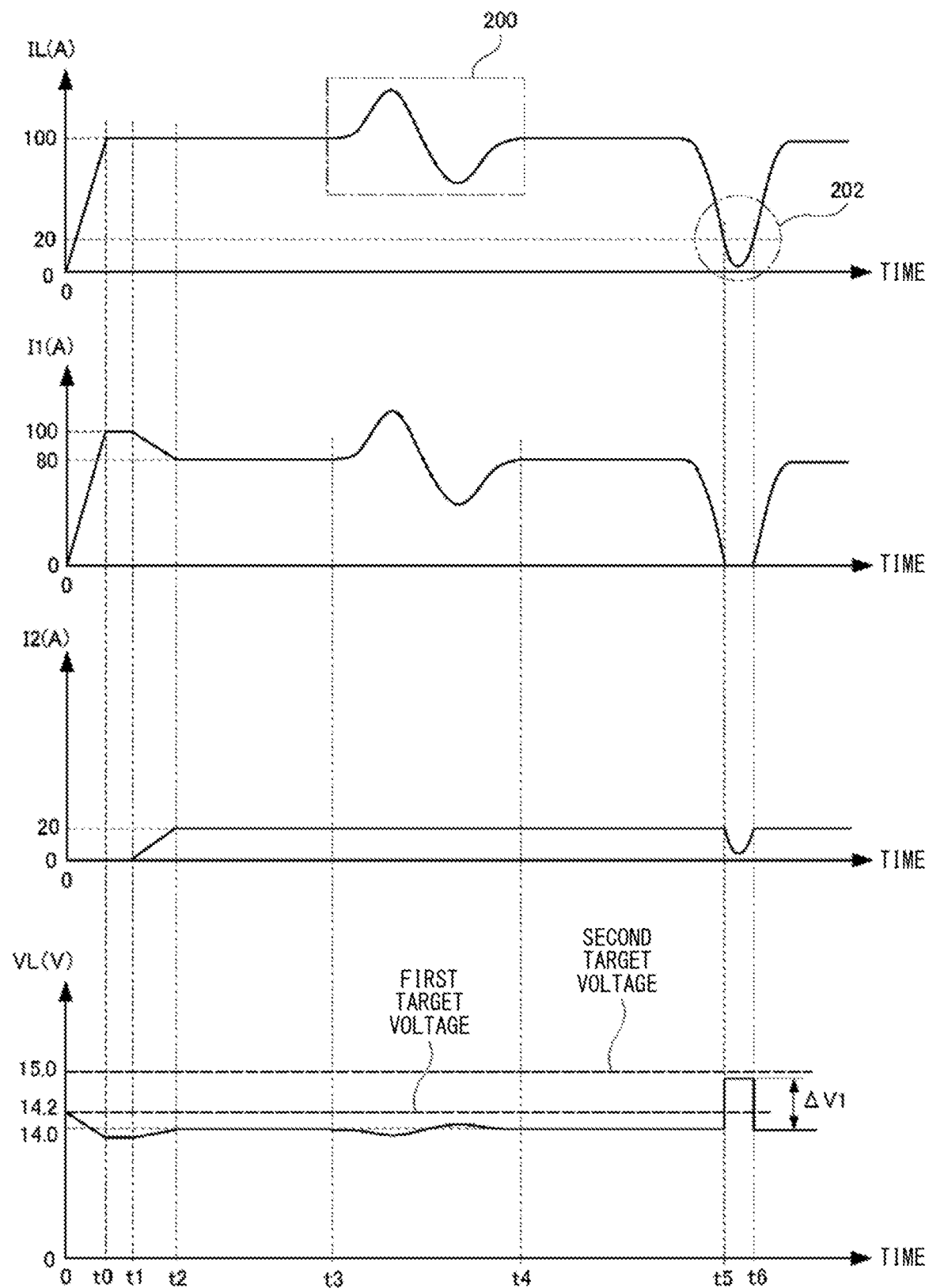
FIG. 6 is graphs showing changes in currents and a voltage during operation of the DC voltage supply system in FIG. 1.

With reference to FIG. 6, changes in the voltage and currents in the DC voltage supply system 100 under the above control will be described. The graph at the uppermost stage shows the current value IL of the current supplied from the DC voltage supply system 100 and flowing to the load 110. Here, it is assumed that the current (the load current value transmitted in step 302) initially needed for the load 110 is 100 A. The graphs at the second and third stages show changes in the output currents (I1 and I2) of the first power source 104 and the second power source 106, respectively. The graph at the lowermost stage shows the output voltage VL of the DC voltage supply system 100. In the graph at the lowermost stage, the first and second target voltages which are the target voltages for the first power source 104 and the second power source 106 (i.e., the output voltages of the first power source 104 and the second power source 106) are represented by broken lines. Here, it is assumed that the first target voltage is set at 14.2 V and the second target voltage is set at 15.0 V. In addition, the ratio of currents to be supplied to the load 110 is set to be first power source:second power source=4:1, as a target.

As described above, voltage supply from the DC voltage supply system 100 is started (step 304). Since the current limit value for the second power source 106 is set at 0, no current is supplied from the second power source 106. A voltage equal to the first target voltage is outputted from the first power source 104. The current needed for the load 110 is all supplied from the first power source 104. That is, during a period from 0 to t0 in FIG. 6, the current value IL of the load 110 is equal to the output current value I1 of the first power source 104. The current value IL increases to the current value (100A) initially needed for the load 110, and then becomes stable. That is, at this point of time, power supply from the first power source 104 is started. At this time, the voltage VL supplied to the load 110 is determined by the output voltage V1 of the first power source 104 which is operating in the constant voltage mode. During the period from 0 to t0, the voltage drop due to the parasitic resistance 112 also increases as the output current value I1 of the first power source 104 increases. Therefore, the output voltage VL of the DC voltage supply system 100 decreases from the first target voltage. During a period from t0 to t1 the ratio of the output current value I1 of the first power source 104 is 100% (I1=IL). As a result, the voltage drop due to the parasitic resistance 112 is slightly greater than that when the ratio of the output current value I1 of the first power source 104 is the target ratio (80%). Therefore, the voltage VL becomes stable at a value slightly smaller than the voltage (here, assumed to be 14.0 V) when the ratio of the currents supplied to the load 110 from the first power source 104 and the second power source 106 becomes equal to the target (first power source:second power source=4:1) and the DC voltage supply system 100 becomes stable.

After a predetermined short period has elapsed (at t1 in FIG. 6), the current limit value for the second power source 106 is changed to a value greater than 0 (step 308). As a result, the current value I2 is outputted from the second power source 106, and the current value I2 increases to the current limit value. Here, the current limit value is set at 20 A. After current supply from the second power source 106 to the load 110 is started, the current value I2 increases during a period from t1 to t2. In this period, the current value IL of the current flowing to the load 110 is constant and therefore the output current value I1 of the first power source 104 decreases. After the output current value I2 of the second power source 106 becomes the current limit value (20 A), the current value I2 of the second power source 106 becomes constant (20 A) (during a period from t2 to t3). Thus, the output current value I1 of the first power source 104 also becomes constant. Here, the current limit value for the second power source 106 is set at 20 A. Therefore, if IL is 100 (A), I1 is 100−20=80 (A), and the output voltage VL of the DC voltage supply system 100 becomes 14.0 V as described above.

The current value IL of the current flowing to the load 110 can change. For example, it is assumed that the DC voltage supply system 100 is mounted on an electric vehicle. In this case, the current flowing to electric equipment constituting the load 110 changes in accordance with the state of the electric vehicle (stopped state, driven state, lighting-up state, etc.). For example, it is assumed that the current value IL of the current flowing to the load 110 changes as shown in a rectangle 200 in FIG. 6. Even in this case, if IL≥current limit value is satisfied, the output current value I2 of the second power source 106 is kept at the current limit value (20 A), and the second power source 106 keeps operation in the constant current mode. The change in the current value IL of the current flowing to the load 110 during a period from t3 to t4 is addressed by the first power source 104 (change in the output current value I1). When the output current value I1 of the first power source 104 changes, the voltage drop due to the parasitic resistance 112 changes. Thus, as shown in FIG. 6, the output voltage VL of the DC voltage supply system 100 changes. However, the influence of the voltage drop is small, and therefore the output voltage VL of the DC voltage supply system 100 is kept at a substantially constant value.

In the above description, the current limit value for the second power source 106 is set such that, of the total current (100 A) of the load 110, a current of 20 A (20%) is supplied from the second power source 106 and the remaining current of 80 A (80%) is supplied from the first power source 104. However, the current limit value when the second power source 106 operates in the constant current mode may be changed. Thus, it is possible to freely set the load ratio at which the first power source 104 and the second power source 106 bear the current value IL of the current flowing to the load 110. Even if the current supplied from the DC voltage supply system 100 to the load 110 is changed, the set load ratio can be kept. For example, the current limit value can be determined to be a desired value smaller than a designated current value which is a prediction value of the current to be supplied from the DC voltage supply system 100 to the load 110. The prediction value in this case is, for example, a predicted average value, a predicted maximum value, or the like. If the current limit value is set at ⅕ of the designated current value, the load ratio can be first power source:second power source=4:1. If the current limit value is set at ⅖ of the designated current value, the load ratio can be first power source:second power source=3:2.

Even if the target value of the output voltage is constant, there is variation in the output voltage of the power source. Therefore, considering variation in the output voltage of the first power source 104, it is preferable that the second target voltage is set to be not less than the upper limit value of variation in the voltage outputted from the first power source 104 on the basis of the set first output voltage. Thus, the second power source 106 can be started, and it is possible to avoid a state in which only the first power source 104 supplies a current to the load 110 and the load is concentrated only on the first power source 104. The variation includes variation due to the power source itself and variation due to the parasitic resistance 112. Regarding the variation, output voltages of a large number of products are statistically processed under the same condition and setting is made on the basis of the obtained distribution. That is, under the assumption that the distribution of the output voltages is in accordance with a normal distribution, for example, a value obtained by adding 3σ (σ is a standard deviation) to the average value of the output voltages is used as the upper limit value. Thus, the output voltage becomes a value smaller than this upper limit value with a certain probability. In actuality, such values constitute some of the rated values of the DC-DC unit. That is, in the present embodiment, an upper limit value indicated by the rated value of the DC-DC unit may be used as the upper limit value of the variation.

In FIG. 6, even when the current value IL of the current flowing to the load 110 decreases so that the current value IL becomes equal to the current limit value as shown in a circle 202, the second power source 106 keeps operation in the constant current mode and the output current value I2 is kept at the current limit value (20 A). However, the output current value I1 of the first power source 104 becomes 0 (time t5 in FIG. 6). When the current value IL of the current flowing to the load 110 further decreases so that the current value IL becomes smaller than the current limit value, the output current value I2 of the second power source 106 becomes smaller than the current limit value (20 A). As a result, the second power source 106 begins to operate in the constant voltage mode (during a period from t5 to t6 in FIG. 6). Therefore, the voltage VL supplied to the load 110 is determined by the output voltage V2 (i.e., the second target voltage) of the second power source 106. The output voltage VL of the DC voltage supply system 100 becomes a value smaller than the output voltage V2 of the second power source 106 by the voltage drop due to the parasitic resistance 114. That is, the following expression is satisfied.

$$VL = V2 - I2 \times R2$$

However, the second target voltage is greater than the first target voltage, and the voltage drop due to the parasitic resistance 114 is small. Therefore, the voltage VL supplied to the load 110 becomes greater than the value in a state of IL>current limit value. In FIG. 6, this voltage difference is indicated by ΔV1. Thereafter, when the current value IL returns to be greater than the current limit value, the second power source 106 operates in the constant current mode. The output current value I2 is kept at the current limit value (20 A). The output current value I1 of the first power source 104 becomes greater than 0. The output voltage VL of the DC voltage supply system 100 is determined by the output voltage V1 (first target voltage) of the first power source 104 as described above, so that the output voltage VL returns to 14.0 (V).

Therefore, in order to suppress change in the output voltage VL of the DC voltage supply system 100 in the case where the current value IL becomes smaller than the current limit value (during the period from t5 to t6 in FIG. 6), it is preferable that the second target voltage is set to be greater than the first target voltage and as small as possible. As described above, even if the target value for the output voltage is constant, there is variation in the output voltage of the power source. Considering the variation, it is preferable that the second target voltage is set to be the upper limit value of variation in the voltage outputted from the first power source 104 on the basis of the set first output voltage, or a value as close to the upper limit value as possible. An example of a method for determining the upper limit value of the variation is as described above.

First Modification

In the DC voltage supply system 100, as described above, during the period from t5 to t6 in FIG. 6, the second power source 106 operates in the constant voltage mode, so that the output voltage VL changes (increases). A configuration for suppressing the change will be described as a first modification. In this modification, when the DC voltage supply system has become stable, the second target voltage set for the second power source 106 is replaced with the actual output voltage value of the second power source 106.

Figure 7:
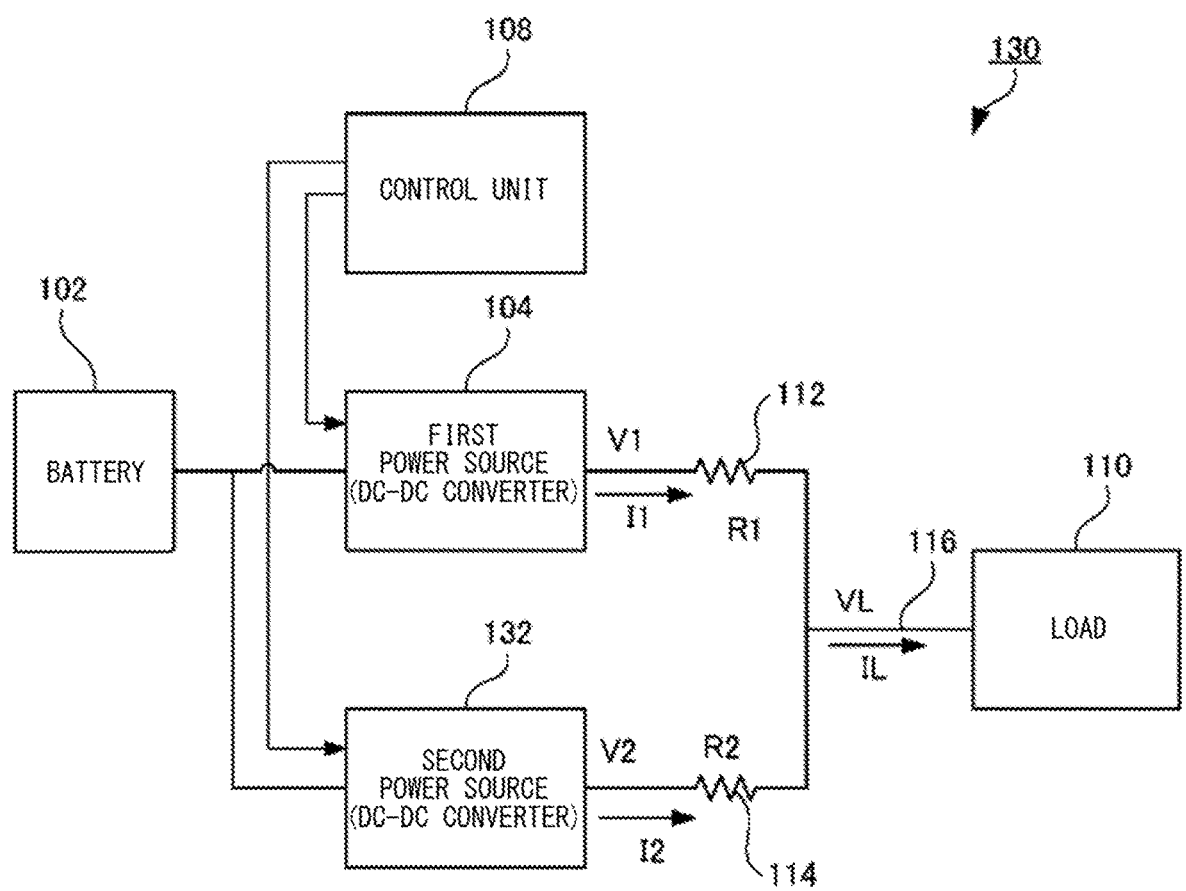
FIG. 7 is a block diagram showing the configuration of a DC voltage supply system according to a first modification.

With reference to FIG. 7, a DC voltage supply system 130 according to the first modification has the same configuration as the DC voltage supply system 100 shown in FIG. 1, but the internal configuration of a second power source 132 is different from that of the second power source 106 in FIG. 1.

Figure 8:
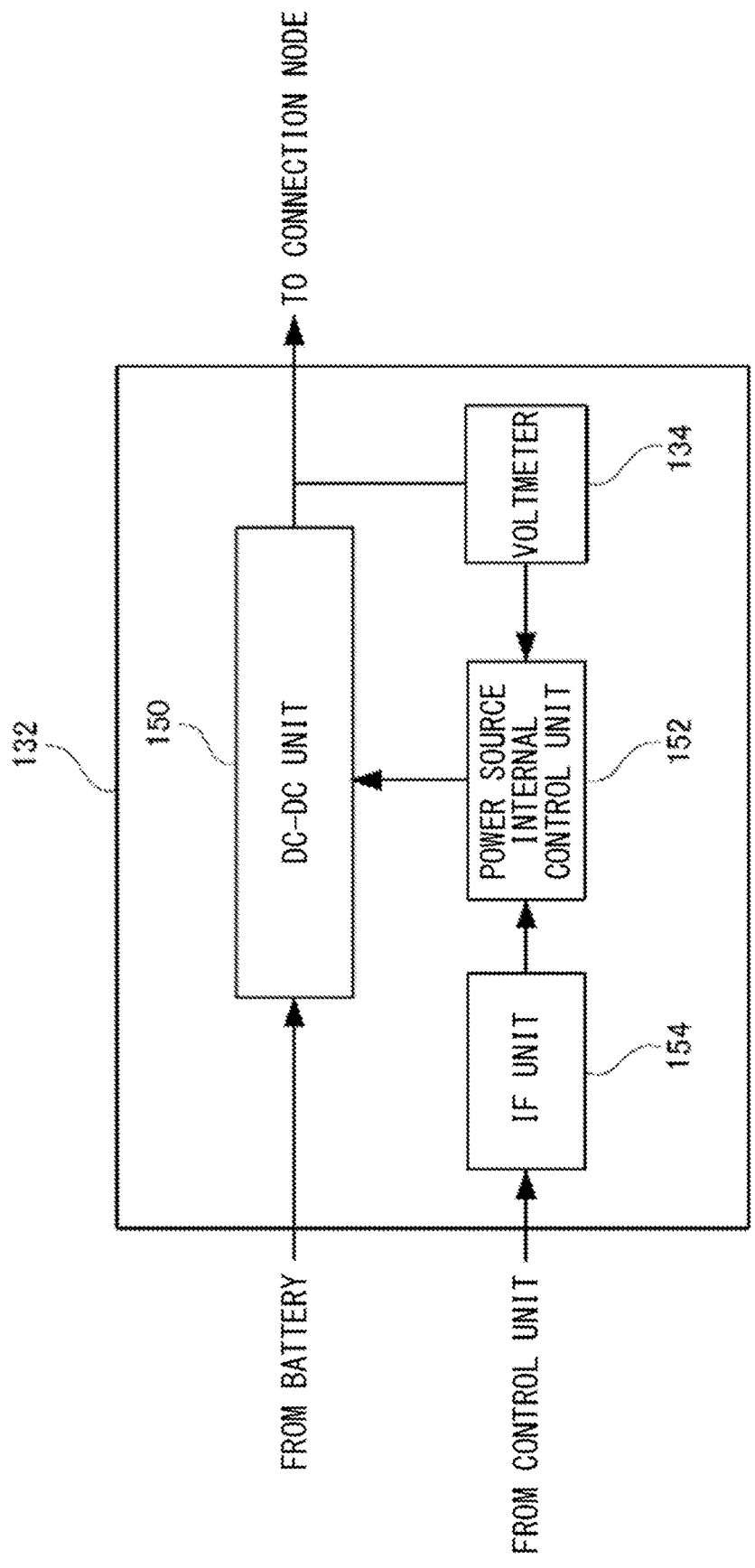
FIG. 8 is a block diagram showing the configuration of the second power source in FIG. 7.

With reference to FIG. 8, the second power source 132 includes the DC-DC unit 150, the power source internal control unit 152, the IF unit 154, and a voltmeter 134. The DC-DC unit 150, the power source internal control unit 152, and the IF unit 154 function in such manners as described regarding the second power source 106 in FIG. 1. The voltmeter 134 measures an output voltage V2 of the second power source 132. The measured voltage value is inputted to the power source internal control unit 152. The voltmeter 134 is a voltage sensor, for example. If the output signal (measured value) from the voltmeter 134 is a digital signal (digital data), the power source internal control unit 152 receives the digital data as it is, and stores the digital data in the internal memory. If the output signal from the voltmeter 134 is an analog signal, the power source internal control unit 152 may be provided with an A/D converter, to sample the signal and convert the signal to digital data.

Figure 9:
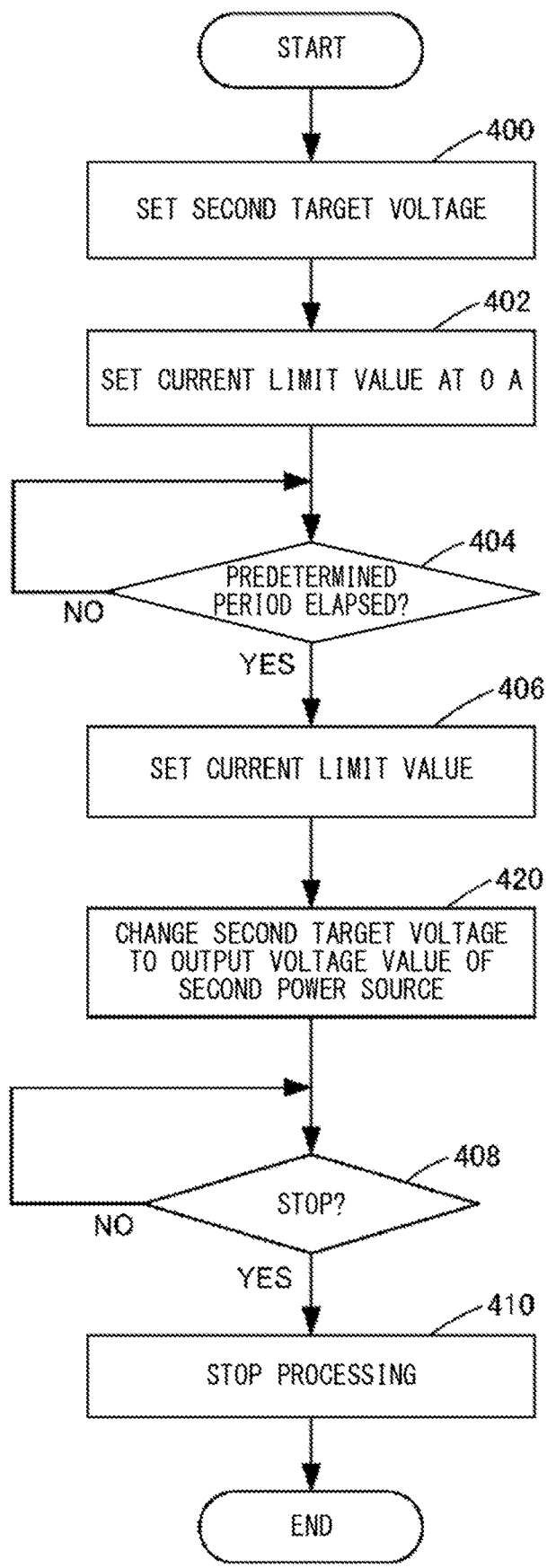
FIG. 9 is a flowchart showing control of the second power source in the DC voltage supply system in FIG. 7.

With reference to FIG. 9, voltage supply operation of the DC voltage supply system 130 will be described.

FIG. 9 is a flowchart in which a new step 420 is added between step 406 and step 408 in the flowchart in FIG. 5. The process shown in FIG. 9 is implemented by the power source internal control unit 152 reading a predetermined program from the internal memory and executing the same.

As described above, through steps 400 to 406, if the output current value IL of the DC voltage supply system 130 is greater than the current limit value, the second power source 106 operates in the constant mode to output a current equal to the set current limit value, and the remaining current of the current value IL of the current flowing to the load 110 is supplied from the first power source 104.

In step 420, the power source internal control unit 152 changes the present target voltage (second target voltage) for the second power source 132 to the measured value of the output voltage of the second power source 132. Specifically, the power source internal control unit 152 acquires the output voltage of the second power source 132 measured by the voltmeter 134, and sets the value thereof as the second target voltage for the DC-DC unit 150. That is, the second target voltage (hereinafter, may be referred to as initial target voltage) received from the control unit 108 and set for the DC-DC unit 150 in step 400 is changed to a new second target voltage (the measured value of the output voltage of the second power source 132).

Thereafter, voltage supply from the DC voltage supply system 130 to the load 110 is performed until it is determined that a stop instruction is received in step 408.

If the DC voltage supply system 130 is stable, the second power source 132 operates in the constant current mode, and the output current value I2 is equal to the current limit value, the output voltage VL of the DC voltage supply system 130 is determined by the output voltage of the first power source 104 which is operating in the constant voltage mode. The output voltage V2 of the second power source 132 and the output voltage VL of the DC voltage supply system 130 satisfy a relationship of $V2=VL+I2 \times R2$. In general, the parasitic resistance is small, and therefore, the voltage drop ($I2 \times R2$) due to the parasitic resistance 114 is small, so that the output voltage V2 of the second power source 132 is slightly greater than the output voltage VL. The parasitic resistance 112 and the parasitic resistance 114 can be considered to be values approximately equal to each other, and the output voltage V2 of the second power source 132 operating in the constant current mode is a value close to the first target voltage. That is, when the second power source 132 is operating in the constant current mode, the output voltage V2 measured by the voltmeter 134 is smaller than the initial target voltage (a value greater than the first target voltage) of the second target voltage set for the second power source 132.

Also in the DC voltage supply system 130, as in the case shown in FIG. 6 (period from t5 to t6) regarding the DC voltage supply system 100, the output current value I1 of the first power source 104 becomes 0 when the second power source 132 operates in the constant voltage mode (I2<current limit value). The output voltage VL of the DC voltage supply system 130 is determined by the output voltage V2 of the second power source 132 which is operating in the constant voltage mode. However, in the DC voltage supply system 130, unlike the DC voltage supply system 100, the second target voltage set for the second power source 132 is replaced with the measured output voltage V2 as described above. Thus, change in the output voltage VL of the DC voltage supply system 130 can be made smaller than that of the DC voltage supply system 100.

Figure 10:
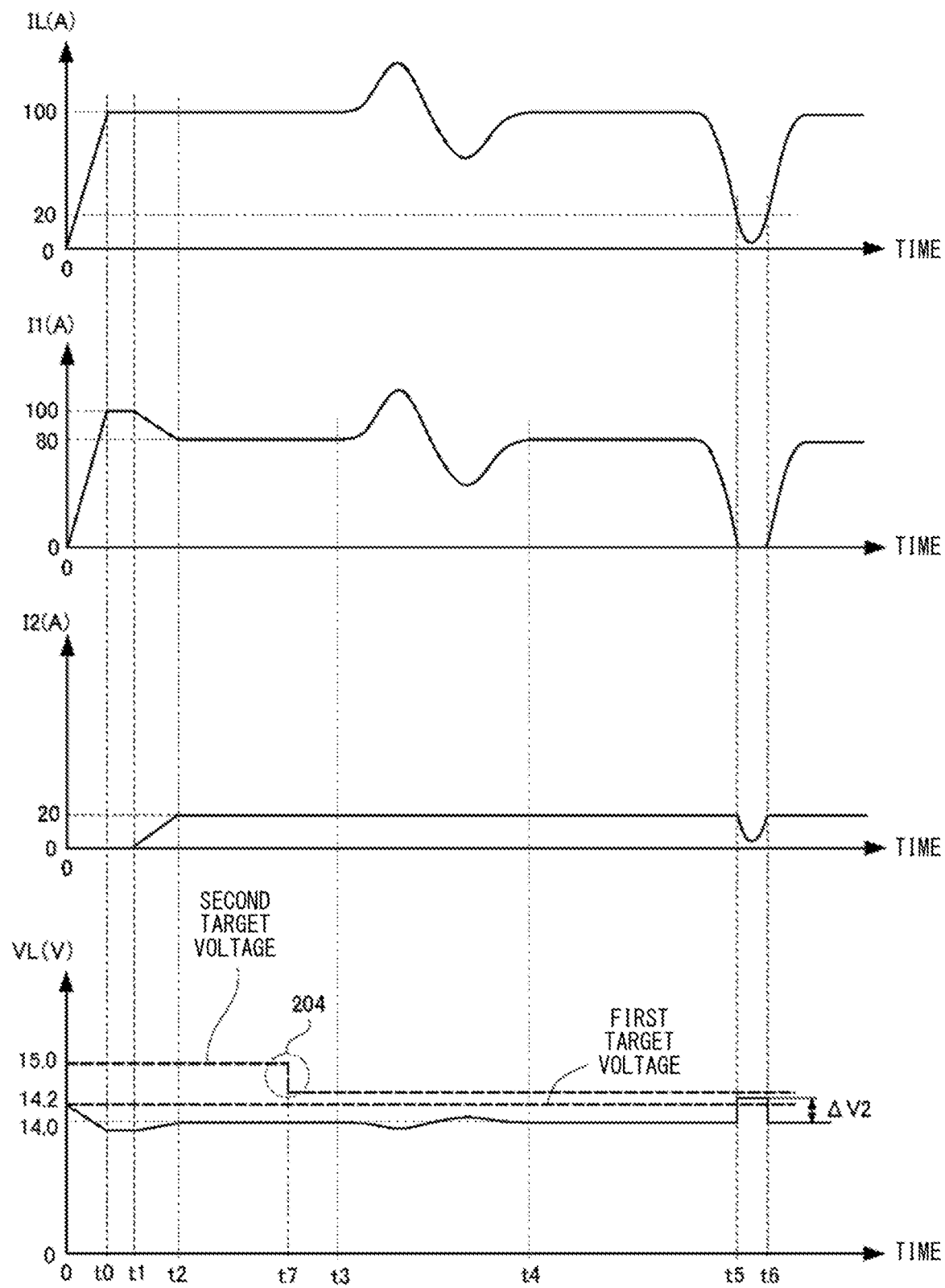
FIG. 10 is graphs showing changes in currents and a voltage during operation of the DC voltage supply system in FIG. 7.

With reference to FIG. 10, more specific description will be given. Graphs in FIG. 10 show changes in the currents and the voltage in a case where the output current value IL of the DC voltage supply system 130 changes in the same manner as in FIG. 6. FIG. 10 is different from FIG. 6 only in the graph at the lowermost stage.

In FIG. 10, the processing in step 420 is executed at time t7. That is, as shown in a circle 204, the second target voltage of the second power source 132 is changed to the measured value of the output voltage V2 of the second power source 132, so that the second target voltage decreases. Except for this, changes in the currents and the voltage during a period from 0 to t5 are the same as in FIG. 6. During a period from t7 to t5, the second target voltage is different from the value in FIG. 6, but the second power source 132 is operating in the constant current mode. The output voltage VL of the DC voltage supply system 130 is determined by the output voltage V1 of the first power source 104, i.e., the first target voltage, and therefore the output voltage VL changes in the same manner as in FIG. 6. Thereafter, during a period from t5 to t6, the output current value IL of the DC voltage supply system 130 decreases. When the output current value IL has become smaller than the current limit value, the output voltage VL of the DC voltage supply system 130 is determined by the output voltage (second target voltage) V2 of the second power source 132, and thus becomes a value close to the output voltage V2 of the second power source 132. In the DC voltage supply system 130, the second target voltage is set to be smaller than the initial target voltage, after time t7. As a result, change (indicated by $\Delta V2$ in FIG. 10) in the output voltage VL of the DC voltage supply system 130 becomes smaller than in the case where the second target voltage remains the initial target voltage (FIG. 6).

In a state in which the DC voltage supply system 130 is stable, the second power source 132 operates in the constant current mode, and the output current value I2 is equal to the current limit value, the output voltage of the second power source 132 is measured. The second target voltage (initial target voltage) is replaced with the measured value. Therefore, even if the second target voltage is initially set at a comparatively great value, the second target voltage is reduced to be close to the upper limit value of variation in the first target voltage. As a result, it is possible to reduce change in the output voltage VL of the DC voltage supply system 130 caused by the second power source 132 operating in the constant voltage mode.

Second Modification

A configuration, different from the first modification, for suppressing change (increase) in the output voltage VL of the DC voltage supply system during the period from t5 to t6 in FIG. 6 will be described as a second modification. In this modification, the current limit value is repeatedly changed in accordance with the current value IL supplied from the DC voltage supply system to the load.

Figure 11:
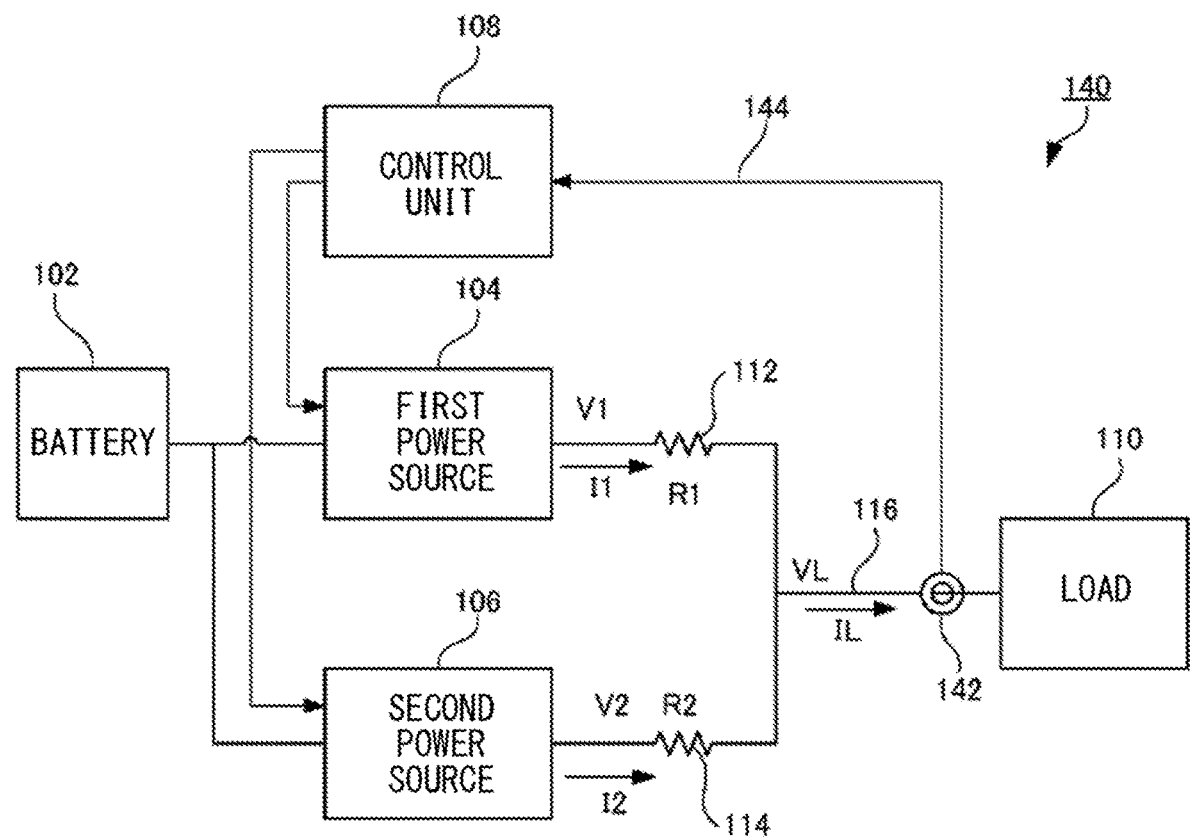
FIG. 11 is a block diagram showing the configuration of a DC voltage supply system according to a second modification.

With reference to FIG. 11, a DC voltage supply system 140 according to the second modification is configured such that an ammeter 142 for measuring an output current value IL of the DC voltage supply system 140 and a current value transmission line 144 are added to the DC voltage supply system 100 shown in FIG. 1. The ammeter 142 is a current sensor, for example. The measured current value is transmitted to the control unit 108 via the current value transmission line 144. If the output signal (measured value) from the ammeter 142 transmitted through the current value transmission line 144 is a digital signal (digital data), the control unit 108 receives the digital data as it is, and stores the digital signal in the memory 122, for example. If the output signal from the ammeter 142 transmitted through the current value transmission line 144 is an analog signal, the control unit 108 may be provided with an A/D converter, to sample the signal and convert the signal to digital data.

Figure 12:
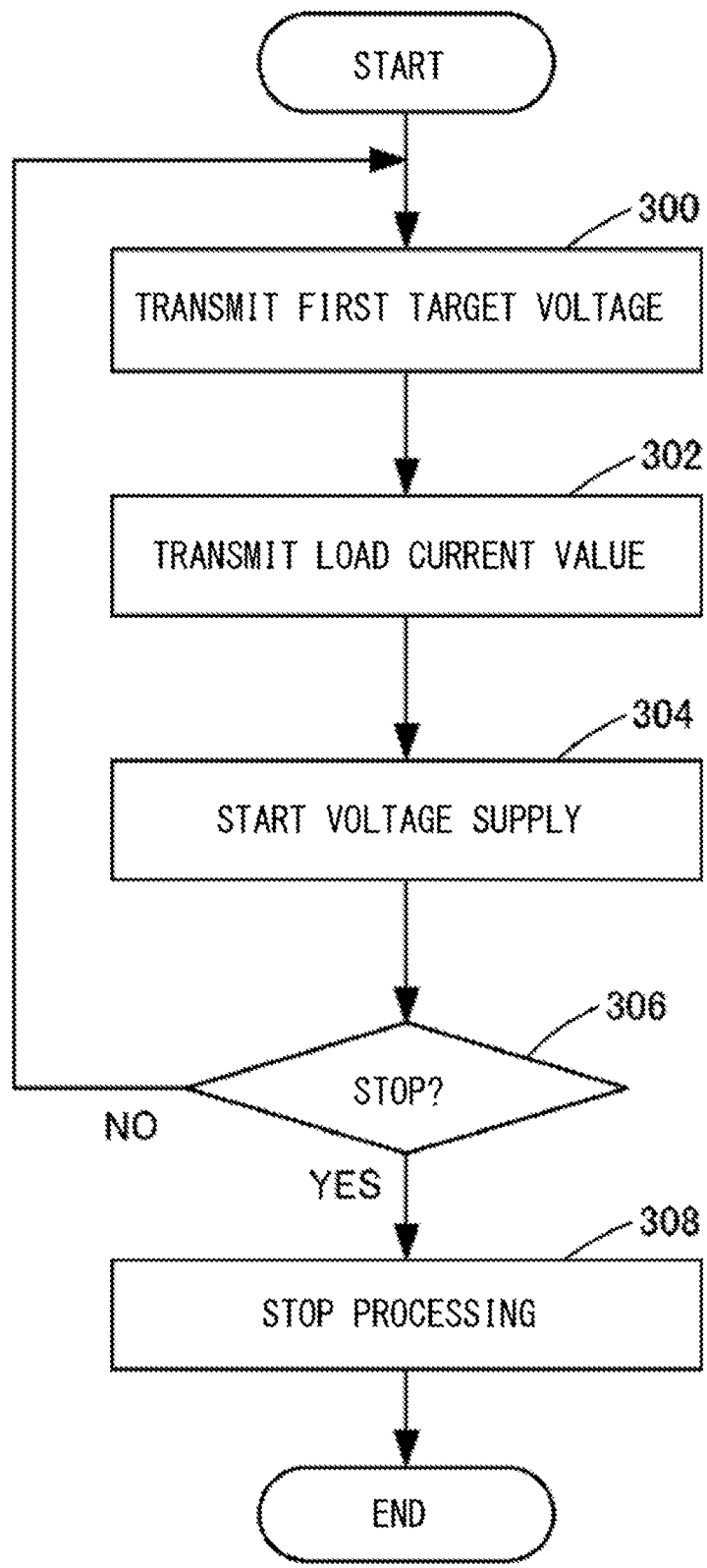
FIG. 12 is a flowchart showing control of the control unit in the DC voltage supply system in FIG. 11.
Figure 13:
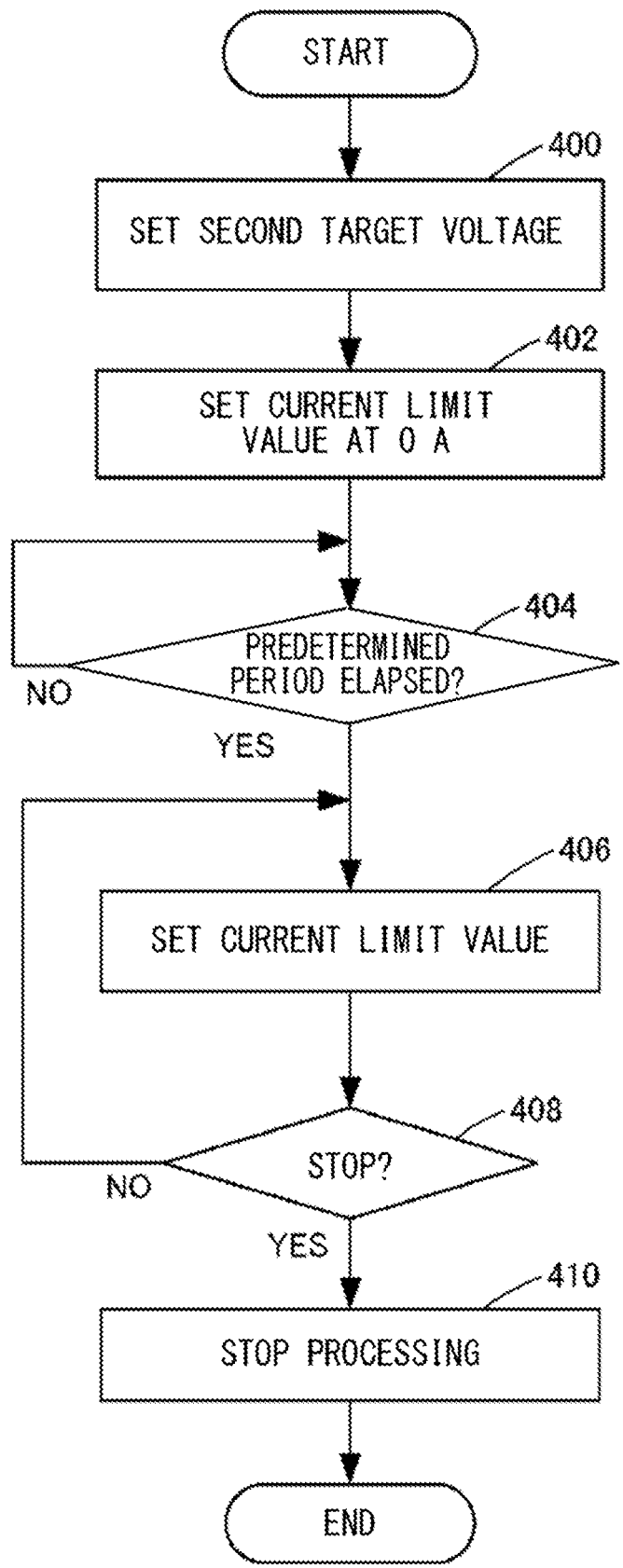
FIG. 13 is a flowchart showing control of the second power source in the DC voltage supply system in FIG. 11.

With reference to FIG. 12 and FIG. 13, voltage supply operation of the DC voltage supply system 140 will be described. FIG. 12 is a flowchart changed so as to return to step 300 if the determination result of step 306 is NO in the flowchart in FIG. 4. FIG. 13 is a flowchart changed so as to return to step 406 if the determination result of step 408 is NO in the flowchart in FIG. 5.

The process shown in FIG. 12 is implemented by the CPU 120 reading a predetermined program from the memory 122 and executing the same. As described above, after steps 300 to 304 are executed and voltage supply from the DC voltage supply system 140 is started, in step 306, the CPU 120 determines whether or not an instruction to stop the DC voltage supply system 140 is received. If it is determined that a stop instruction is received, the control proceeds to step 308. Otherwise, the control returns to step 300.

Thus, until a stop instruction is received, steps 300 to 304 are repeated, so that the CPU 120 repeatedly transmits the load current value to the second power source 106. At this time, unlike the DC voltage supply system 100 in FIG. 1, the load current value repeatedly transmitted through the processes for the second time and later in step 302 is the measured value of the current value IL measured by the ammeter 142. It is noted that step 304 is processing of transmitting a start instruction and thus the start instruction is repeatedly transmitted, but the first power source 104 and the second power source 106 may ignore the repeatedly transmitted start instruction.

The process shown in FIG. 13 is implemented by the power source internal control unit 152 reading a predetermined program from the internal memory and executing the same. As described above, through steps 400 to 404, and step 406 initially executed, if the output current value IL of the DC voltage supply system 140 is greater than the current limit value, the second power source 106 operates in the constant current mode to output a current equal to the set current limit value, and the remaining current of the current value IL of the current flowing to the load 110 is supplied from the first power source 104. Thereafter, in step 408, the power source internal control unit 152 determines whether or not a stop instruction is received from the control unit 108. If it is determined that a stop instruction is received, the control proceeds to step 410. Otherwise, the control returns to step 406. Thus, the processes for the second time and later in step 406 are repeated until determining to perform stop processing.

In the repeated step 406, every time the load current value (the current value IL of the current flowing to the load 110) transmitted from the control unit 108 is acquired, the power source internal control unit 152 determines the current limit value from the load current value in accordance with a load ratio a ($0 \leq a \leq 1$) of the second power source 106, and sets the current limit value for the DC-DC unit 150. Specifically, the power source internal control unit 152 determines, as a new current limit value, a value that is a times the acquired load current value (the measured value of the current value IL). Thus, the output current of the second power source 106 in the constant current mode is limited by the newly set current limit value. In this modification, the power source internal control unit 152 acquires the load current value from the control unit 108. However, the power source internal control unit 152 may acquire the load current value directly from the ammeter 142. Alternatively, an ammeter for measuring a current outputted from the first power source 104 instead of the load current value may be provided, and the power source internal control unit 152 may receive the output of the ammeter and calculate the load current value on the basis of the sum of the output of the ammeter and a current outputted from the second power source 106.

Figure 14:
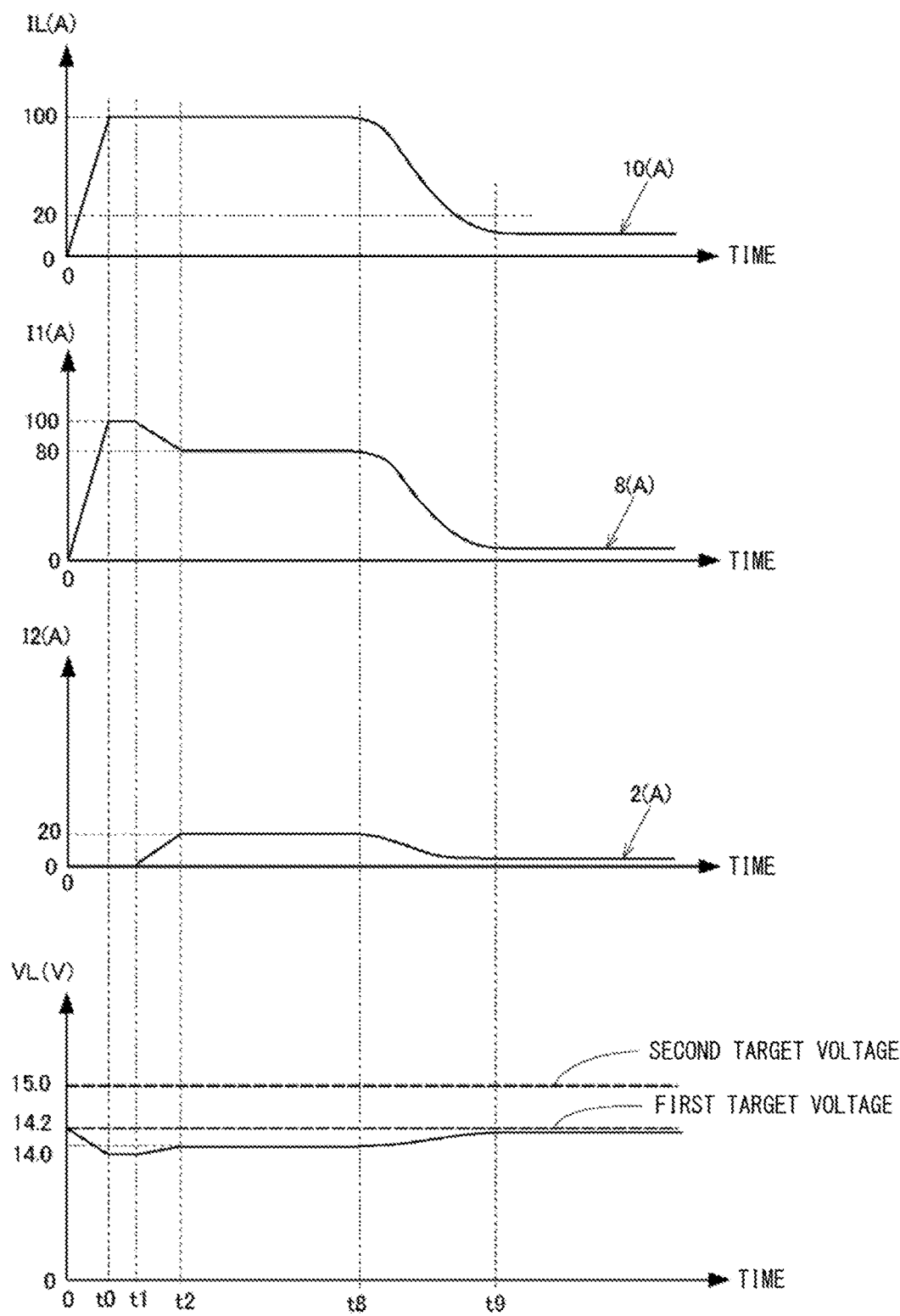
FIG. 14 is graphs showing changes in currents and a voltage during operation of the DC voltage supply system in FIG. 11.

With reference to FIG. 14, changes in the voltage and the currents in the DC voltage supply system 140 will be described. In FIG. 14, the graph at the uppermost stage shows the current value IL of the current supplied from the DC voltage supply system 140 and flowing to the load 110, as in FIG. 6 and FIG. 10. The graphs at the second and third stages show the output currents (I1 and I2) of the first power source 104 and the second power source 106, respectively. The graph at the lowermost stage shows the output voltage VL of the DC voltage supply system 140.

Operation until time t2 from when the DC voltage supply system 140 is started and voltage supply is started (steps 400 to 404, and step 406 initially executed), is the same as in FIG. 5. During this period, the currents and the voltage change in the same manner as in FIG. 6. After time t2, in the DC voltage supply system 140, the processes for the second time and later in step 406 are repeated. That is, processing of setting, as a new current limit value, a value that is a times (0≤a≤1) the measured value of the current value IL measured by the ammeter 142, is repeated. Therefore, if the current value IL of the current flowing to the load 110 changes, the current limit value for the second power source 106 also changes accordingly. Here, it is assumed that a is 0.2.

In FIG. 14, during a period from t2 to t8, the current value IL of the current flowing to the load 110 is constant (100 A) and is not changed. The measured value of the output current value I2 of the second power source 106 is also constant (20 A) and is not changed. The current limit value for the second power source 106 is updated by the same value (20 A).

During a period from t8 to t9, the current value IL of the current flowing to the load 110 decreases. During this period, the current limit value of the second power source 106 is changed to 0.2 times the measured value, every time the current value IL is measured. Therefore, the output current value I2 of the second power source 106 in the constant current mode is a value that is 0.2 times (20%) the measured value of the current value IL measured at the last time. The remaining current that is 80% of the current value IL is supplied from the first power source 104. That is, during a period in which the current value IL of the current flowing to the load 110 changes, the output currents of the first power source 104 and the second power source 106 both change in proportion to the current value IL. Even if the current value IL has become smaller than the initial value (e.g., 20 A) of the current limit value, the first power source 104 operates in the constant voltage mode to supply a current. Therefore, the output voltage of the DC voltage supply system 140 is kept in a state of being determined by the output voltage V1 of the first power source 104. When the output current value I1 of the first power source 104 changes, the voltage drop due to the parasitic resistance 112 changes, so that the output voltage VL of the DC voltage supply system 140 changes, but the change amount thereof is smaller than the change amount ΔV2 shown in FIG. 10.

In FIG. 14, after time t9, the current value IL becomes constant at a value (10 A) smaller than the initial value of the current limit value. The current limit value is repeatedly set at 2 A (=0.2×10 A). A current of 2 A is supplied from the second power source 106 (constant current mode), and the remaining current of 8 A is supplied from the first power source 104 (constant voltage mode).

Although not shown in FIG. 14, also in a case where the current value IL increases from 10 A, the current limit value is changed in the same manner. As a result, currents are supplied from both of the second power source 106 (constant current mode) and the first power source 104 (constant voltage mode).

In the second modification, the case of directly measuring the current flowing to the load 110 has been described. However, another method may be employed as long as the output current value IL of the DC voltage supply system 140 can be found. For example, the output current value I1 of the first power source 104 and the output current value I2 of the second power source 106 may be measured and the measured values may be summed to calculate the output current value IL. The measured values of ammeters that measure the respective currents are transmitted to the control unit 108 in the same manner as described above. By summing both measured values acquired by the control unit 108, the output current value IL of the DC voltage supply system 140 can be calculated.

In the second modification, even if the current value IL of the load 110 decreases, a current is supplied from the second power source 106 unless the current value IL becomes 0. However, when the current value IL of the load 110 has become smaller than a predetermined value, the current limit value may be set at 0 so that no current is outputted from the second power source 106. In this case, a current is supplied to the load 110 only from the first power source 104. At this time, the current that had been supplied from the second power source 106 becomes 0. For compensating this, the output current value I1 of the first power source 104 slightly increases and thus the voltage drop due to the parasitic resistance 112 slightly increases. Therefore, the output voltage VL of the DC voltage supply system 140 slightly decreases, but this change is not great.

For example, in a case where currents are allocated at a ratio of first power source:second power source=4:1, if the current value of the load is 100 A, currents are allocated as 80 A:20 A. As described above, even if the current value of the load sharply decreases, until the current value of the load is reduced to 20 A (sharp decrease by 80 A), the second power source can be kept in the constant current mode (the output voltage of the second power source does not influence the output voltage of the DC voltage supply system). On the other hand, if the current of the load becomes 10 A, currents are allocated as 8 A:2 A, and if change at this time is sharp decrease, with only reduction to 2 A, i.e., only reduction by 8 A, the second power source comes into the constant voltage mode. As described above, in a low-load state in which the current value of the load is comparatively small, if currents are allocated at a ratio of 4:1, the second power source comes into the constant voltage mode even with a small load change, so that the output voltage of the second power source is outputted as the output voltage of the DC voltage supply system. In order to avoid this, it is preferable to set the current limit value at 0 A.

In the above description, the case where two power sources are connected in parallel has been described. However, three or more power sources may be connected in parallel. In this case, one power source (corresponding to the first power source 104) is constantly operated by CV control. The other power sources are operated by CVCC control. The target voltage and the current limit value may be set as shown in FIG. 3, FIG. 6, or the flowchart in FIG. 9. Thus, it is possible to avoid a load concentrated state in which only a specific power source supplies a current to the load. It is possible to supply currents to the load from the plurality of power sources at desired load ratios.

In the above description, the case where the control unit 108 transmits the first target voltage and the load current value to the second power source, and the second power source determines the second target voltage and the current limit value and sets them for the DC-DC unit 150, has been described. However, this disclosure is not limited thereto. The function of the second power source 106 for determining the second target voltage and the current limit value as described in the first embodiment may be imparted to the control unit 108, or may be imparted to the first power source 104. Similarly, the function of the second power source for determining the second target voltage and the current limit value as described in the first modification or the second modification may be imparted to the control unit 108, or may be imparted to the first power source 104.

In the case where the control unit 108 repeats the processing of transmitting the measured value of the output current value IL of the DC voltage supply system 140 measured by the ammeter 142 to the second power source 106, it takes time per processing from when the output current value IL is measured to when the measured value is acquired by the control unit 108. In addition, in the case of repeating the processing of transmitting the measured value of the output current value IL to the second power source 106, it takes time for the control unit 108 to calculate a new current limit value. Further, in the case of repeating the processing of determining a new current limit value from the measured value of the output current value IL and transmitting the new current limit value to the second power source 106, it takes time from when the control unit 108 outputs the new current limit value to when the new current limit value is received by the second power source 106. In this case, for example, it is assumed that the output current value IL is sharply changed (decreased) in a shorter time than the delay time from when the output current value IL is measured to when the new current limit value is received by the second power source 106. In this case, the load current becomes smaller than the current limit value, so that the second power source 106 begins to operate in the constant voltage mode (CV control). As a result, the output voltage VL of the DC voltage supply system 140 increases.

In order to suppress this, for example, the second power source 106 itself may detect that the second power source 106 is not operating in the constant current mode (is operating in the constant voltage mode). Upon such detection, the set current limit value is decreased. Thus, the second power source 106 can keep operation in the constant current mode (CC control). Thus, even in the case where the load current sharply changes and there is some delay until the new current limit value is received from the control unit 108, it is possible to suppress increase in the output voltage of the DC voltage supply system. It is noted that, when it is detected that the second power source 106 is not operating in the constant current mode, the second power source 106 may set the current limit value at 0.

For example, the second power source 106 may be provided with a state detection unit for detecting the operation mode of the second power source 106 itself, and may detect that the second power source 106 is not operating in the constant current mode. When the state detection unit has detected that the second power source 106 is not operating in the constant current mode, the second power source 106 can immediately decrease the current limit value set at present.

For detecting that the second power source 106 is not operating in the constant current mode, measurement for the output current value I2 may be performed inside the second power source 106, instead of providing the state detection unit. For example, inside the second power source 106, the output terminal and the power source internal control unit 152 may be connected to each other via an electric wire and an A/D converter. The power source internal control unit 152 of the second power source 106 can detect that the second power source 106 is not operating in the constant current mode if the acquired current value (measured value) is smaller than the set current limit value. The power source internal control unit 152 can immediately decrease the current limit value to a value that is smaller than the measured value and not smaller than 0.

For detecting that the second power source 106 is not operating in the constant current mode, in the configuration shown in FIG. 11, an ammeter for measuring the output current value I2 of the second power source 106 may be provided outside the second power source 106 and the measured value may be transmitted to the second power source 106, or whether or not the output voltage of the second power source 106 is equal to the second target voltage may be measured.

In the first embodiment, the first modification, and the second modification described above, there can be a case where the first power source 104 stops for some reason (failure or the like). In such a case, the second power source 106 is to operate in the constant voltage mode (CV control), so that the output voltage VL of the DC voltage supply system increases. As a measure therefor, it is preferable to provide a determination unit for determining whether or not the first power source 104 is stopped. Stop of the first power source 104 is detected by the determination unit, and the second target voltage and the current limit value are changed so that the influence at the time of operation in the constant voltage mode can be minimized. In this way, it is possible to suppress increase in the output voltage of the DC voltage supply system even when the first power source 104 is stopped due to failure or the like.

Whether or not the first power source 104 is stopped can be determined by the control unit 108 or the second power source 106 monitoring a predetermined output signal from the first power source 104, for example. For example, through self-diagnosis, the first power source 104 may output a signal at a first level (e.g., high level) when operating normally, and may output a signal at a second level (e.g., low level) when not operating normally. Through determination for the level of the output signal, the control unit 108 or the second power source 106 can determine whether or not the first power source 104 is stopped. In the case where the second power source 106 monitors the output signal from the first power source 104, when the level of the output signal has become the second level, the second target voltage and the current limit value set at present may be changed to a new second target voltage and a new current limit value. The new current limit value is greater than the current limit value set at present, and is, for example, the rated maximum current value which is the maximum value of the current that the second power source 106 can stably output. The new second target voltage is smaller than the second target voltage set at present. Since the value of the parasitic resistance 112 and the value of the parasitic resistance 114 are not greatly different from each other, it is preferable that the new second target voltage is a value equal to the first target voltage or a value close to the first target voltage.

In the case where the control unit 108 monitors the output signal from the first power source 104, when the level of the output signal has become the second level, a new second target voltage and a new current limit value may be transmitted from the control unit 108 to the second power source 106.

In the above description, the case where the first power source 104 and the second power source 106 are DC-DC converters that convert the DC output voltage of the battery 102, has been described. However, this disclosure is not limited to such a configuration. The first power source 104 may be a power source that operates in the constant voltage mode by CV control, the second power source may be a power source capable of operating in the constant voltage mode and the constant current mode by CVCC control, and the DC voltage supply system may be constituted of a plurality of such power sources. It is noted that, as described above, three or more power sources may be connected in parallel, and in the case where three or more power sources are connected in parallel, one power source may be operated by CV control and the other power sources may be operated by CVCC control.

Second Embodiment

[Entire Configuration]

The first embodiment relates to DC-DC converters. However, this disclosure is not such an embodiment. This disclosure is applicable also to DC-AC converters, AC-AC converters, or AC-DC converters. An AC voltage supply system according to the second embodiment described below includes inverters that perform DC-AC conversion.

Figure 15:
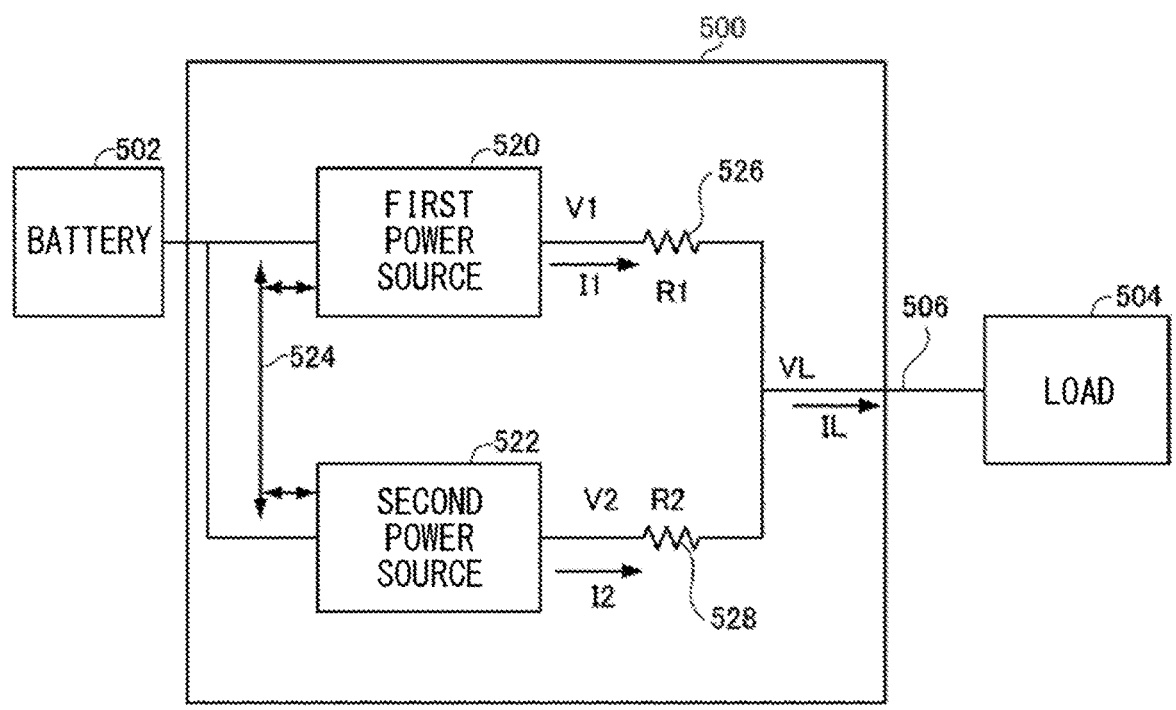
FIG. 15 is a block diagram showing the configuration of an AC voltage supply system according to the second embodiment of this disclosure.

FIG. 15 shows the schematic configuration of an AC voltage supply system 500 according to the second embodiment. With reference to FIG. 15, the AC voltage supply system 500 is supplied with a DC voltage from a battery 502, and supplies an AC voltage to a load 504.

The AC voltage supply system 500 includes a first power source 520 and a second power source 522 connected in parallel between the high-voltage battery 502 and the load 504. The AC voltage supply system 500 is, for example, used for an electric vehicle or the like, and supplies an AC voltage at a constant voltage to the load 504 such as home electric appliances.

Although shown by a single line in FIG. 15, the DC voltage from the battery 502 is supplied to each of the first power source 520 and the second power source 522 through a pair of two lines, i.e., a connection line connected to a positive electrode of the battery 502 and a connection line connected to a negative electrode thereof. The output of the first power source 520 and the output of the second power source 522 are connected to a connection node, and then connected to the load 504 via a connection line 506. The AC voltage supply system 500 further includes a parasitic resistance 526 present between the first power source 520 and the connection node, a parasitic resistance 528 present between the second power source 522 and the connection node, and a bus 524 that allows communication between the first power source 520 and the second power source 522.

Also in the description below, as in the first embodiment, the output voltage and the output current value of the first power source 520 are defined as output voltage V1 and output current value I1, and the output voltage and the output current value of the second power source 522 are defined as output voltage V2 and output current value I2. The voltage and the value of the current supplied to the load 504 via the connection line 506 are defined as voltage VL and current value IL. The parasitic resistance 526 and the parasitic resistance 528 are substantial resistances on wires including the resistance of an electric wire, the resistance of a connection portion, and the like, and have resistance values R1 and R2, respectively.

Figure 16:
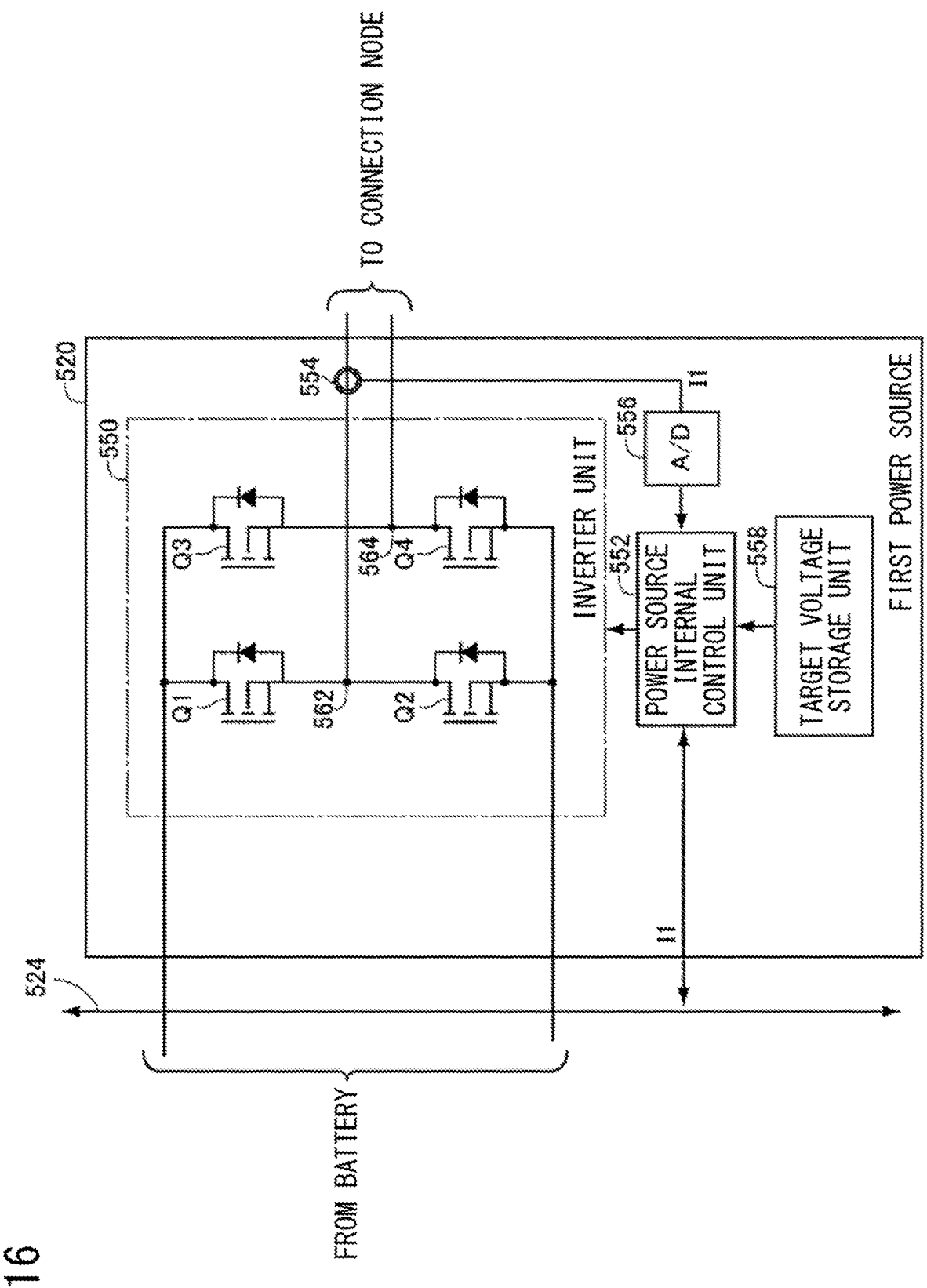
FIG. 16 is a block diagram showing the configuration of a first power source of the AC voltage supply system in FIG. 15.

FIG. 16 shows the configuration of the first power source 520. With reference to FIG. 16, the first power source 520 includes: an inverter unit 550 which receives a DC voltage from the battery 502, converts the DC voltage to an AC voltage having a rectangular waveform, and outputs the AC voltage; a power source internal control unit 552 which includes a microprocessor and which adjusts duty cycles and ON/OFF timings of semiconductor switching elements in the inverter unit 550 so that the AC voltage to be supplied to the load 504 becomes a target value (first target voltage), thereby performing constant voltage control of the first power source 520; a current sensor 554 which is formed from a current transformer (CT) and which measures a current outputted from the inverter unit 550 and outputs an analog measurement signal; an A/D conversion circuit 556 which performs A/D conversion of the analog signal from the current sensor 554 and inputs the resultant signal to the power source internal control unit 552; and a target voltage storage unit 558 which stores a target voltage for the constant voltage control of the first power source 520 by the power source internal control unit 552, and provides the target voltage to the power source internal control unit 552.

The power source internal control unit 552 can communicate with the second power source 522 via the bus 524, and in the present embodiment, transmits the current value I1 detected by the current sensor 554.

In the present embodiment, the inverter unit 550 is a full-bridge-type inverter and includes switching elements Q1, Q2, Q3, Q4 connected in a full-bridge form. The drain of the switching element Q1 is connected to the positive electrode of the battery 502. The source of the switching element Q1 is connected to the drain of the switching element Q2 at a node 562. The source of the switching element Q2 is connected to the negative electrode of the battery 502. The drain of the switching element Q3 is connected to the positive electrode of the battery 502. The source of the switching element Q3 is connected to the drain of the switching element Q4 at a node 564. The source of the switching element Q4 is connected to the negative electrode of the battery 502.

In order to convert the output voltage to a different voltage, for example, a DC-DC unit may be provided at a stage preceding the inverter unit 550, or a voltage conversion unit using a transformer may be provided at a stage subsequent to the inverter unit 550.

The node 562 and the node 564 are connected to the positive and negative power source terminals of the load 504, respectively. In the present embodiment, the current sensor 554 is provided so as to measure a current on the connection line from the node 562 to the load 504.

Figure 17:
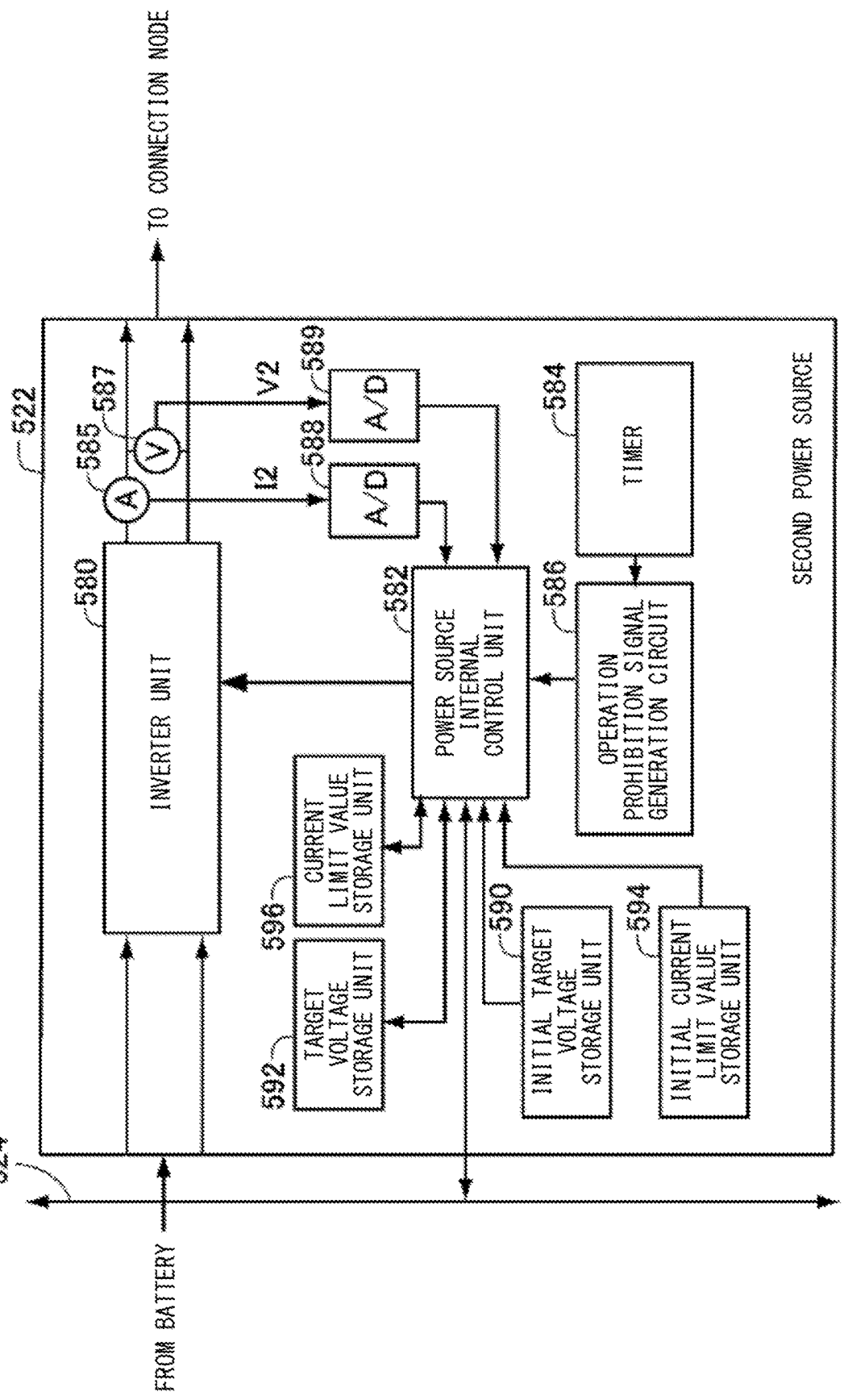
FIG. 17 is a block diagram showing the configuration of a second power source of the AC voltage supply system in FIG. 15.

FIG. 17 shows the configuration of the second power source 522. With reference to FIG. 17, the second power source 522 includes: an inverter unit 580 having the same configuration as the inverter unit 550 in FIG. 16; a current sensor 585 for measuring the output current value I2 of the inverter unit 580; a voltage sensor 587 for measuring the output voltage V2 of the inverter unit 580; a power source internal control unit 582 for performing control so that the current value from the inverter unit 580 becomes a target value; an A/D conversion circuit 588 which performs A/D conversion of an analog signal outputted from the current sensor 585 and indicating the current value I2, and inputs the resultant signal to the power source internal control unit 582; and an A/D conversion circuit 589 which performs A/D conversion of an analog signal outputted from the voltage sensor 587 and indicating the output voltage V2, and inputs the resultant signal to the power source internal control unit 582.

The second power source 522 further includes: a timer 584 for measuring elapse of a predetermined period from the start of the second power source 522 (AC voltage supply system 500); and an operation prohibition signal generation circuit 586 for outputting a signal for prohibiting power conversion operation of the inverter unit 580, to the power source internal control unit 582, until the predetermined period elapses from the start, on the basis of the output from the timer 584. When it is detected by the timer 584 that the predetermined period has elapsed, the operation prohibition signal is canceled (disabled) and the inverter unit 580 is started. In the present embodiment, when the operation prohibition signal is at a high level, power conversion operation of the inverter unit 580 is prohibited, and when the operation prohibition signal is at a low level, the power conversion operation is permitted. This combination may be reversed, or prohibition/cancelation may be designated by a digital signal of two bits or more. With this configuration, the inverter unit 580 starts with a delay of the predetermined period after the second power source 522 is started (i.e., after the first power source 520 is started).

The second power source 522 further includes an initial target voltage storage unit 590 which stores an initial target voltage value for the second power source 522; a rewritable target voltage storage unit 592 which stores a target voltage value for the second power source 522 to perform constant voltage operation; an initial current limit value storage unit 594 which stores an initial current limit value for the second power source 522 and inputs the initial current limit value to the power source internal control unit 582; and a rewritable current limit value storage unit 596 which stores a current limit value to be updated along with operation of the second power source 522. The initial target voltage value for the second power source 522 is greater than the target voltage value for the first power source 520. Therefore, the second power source 522 can be started without any problem after elapse of the predetermined period from the start of the first power source 520.

Figure 18:
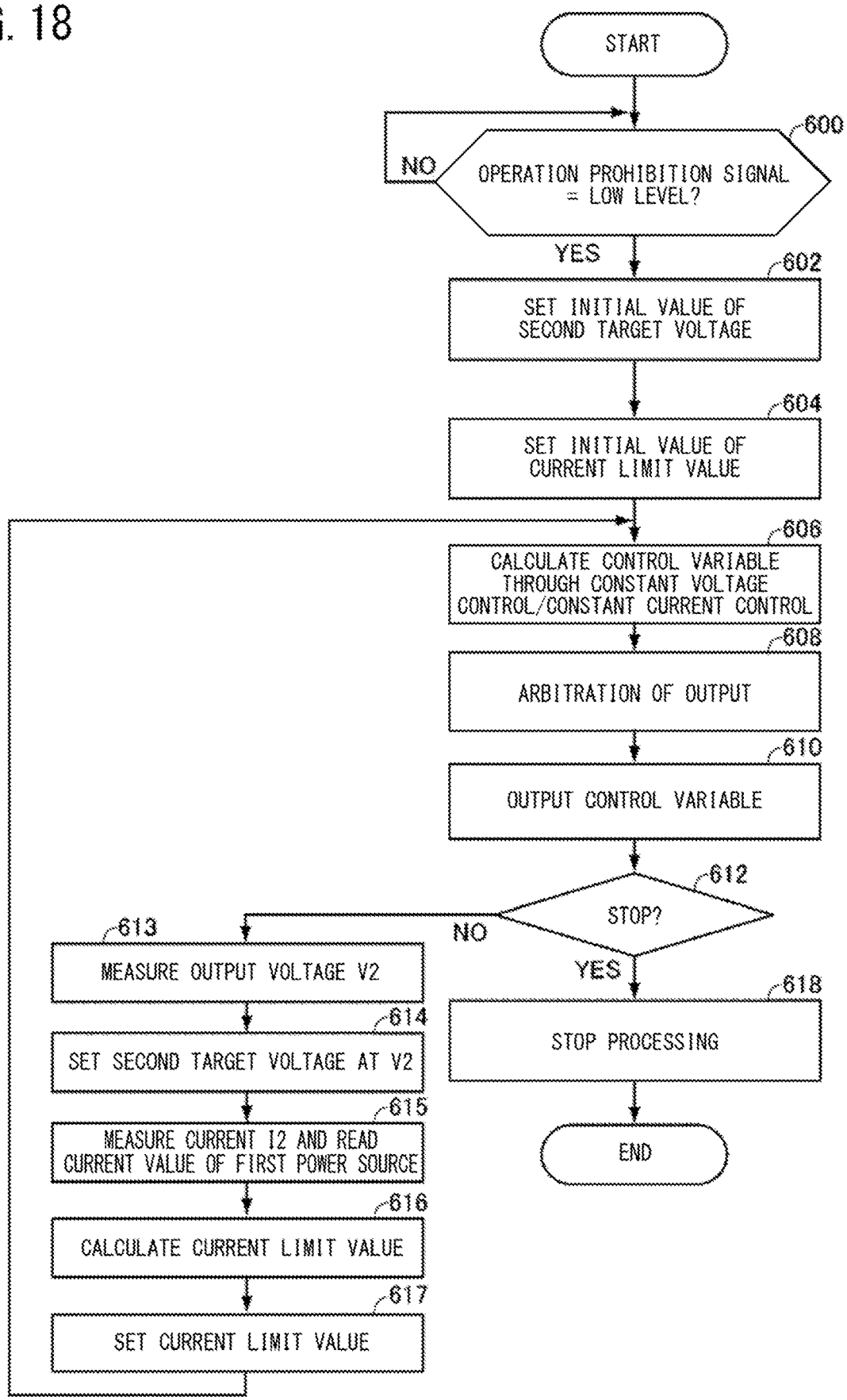
FIG. 18 is a flowchart showing the control structure of a program to be executed by an internal control circuit of the second power source in FIG. 17.

FIG. 18 is a flowchart showing the control structure of a computer program for operating the power source internal control unit 582 so as to implement the function of the second power source 522 in the AC voltage supply system 500 according to the present embodiment. With reference to FIG. 18, this program includes: step 600 of waiting during a period in which the operation prohibition signal inputted from the operation prohibition signal generation circuit 586 is at a high level, after the start of the AC voltage supply system 500, so that the second power source 522 starts later than the first power source 520; step 602 of, when the operation prohibition signal changes to a low level, reading the initial value of the target voltage (second target voltage) for the second power source 522 to perform constant voltage operation, from the initial target voltage storage unit 590, and writing the initial value into the target voltage storage unit 592; and step 604 of reading, from the initial current limit value storage unit 594, the initial value of the limit value for the current to be outputted from the second power source 522, and writing the initial value into the current limit value storage unit 596.

The above program further includes, subsequent to step 604: step 606 of performing both of constant voltage control using the second target voltage and constant current control using the current limit value, and calculating control variables of both controls; step 608 of performing output arbitration so as to select, from the control variables outputted in step 606, the control variable with which the current value becomes smaller; step 610 of outputting operations (duty cycles) of the switching elements of the inverter unit 580 in accordance with the control variable selected through arbitration in step 608; step 612 of determining whether or not a command to stop operation is received, and branching the control flow in accordance with the determination result, and step 618 of executing stop processing in response to the determination that the stop command is received in step 612, and ending execution of the program.

The above program further includes: step 613 of measuring the output voltage V2 of the second power source 522 when the determination in step 612 is negative; step 614 of resetting (updating) the second target voltage to the present output voltage V2 of the second power source 522; subsequent to step 614, step 615 of measuring the output current value I2 of the second power source 522 and reading the output current value I1 of the first power source 520 transmitted from the first power source 520; step 616 of calculating a current limit value $I_{TS}$ for the second power source 522 in accordance with the following Expression (1); and step 617 of updating the current limit value for the second power source 522 stored in the target voltage storage unit 592 (FIG. 17), by the value calculated in step 616, and returning the control to step 606. In the present embodiment, the power source internal control unit 582 receives the output current value I1 of the first power source 520, from the first power source 520. However, the power source internal control unit 582 may directly receive output of the current sensor 554.

[Mathematical 1]

$$I_{TS} = (I1 + I2) * \frac{\text{Rated}_S}{\text{Rated}_M + \text{Rated}_S} \quad (1)$$

It is noted that $I_{TS}$ is the current limit value for the second power source 522, I1 is the value of the load current outputted from the first power source 520, I2 is the value of the load current outputted from the second power source 522, $\text{Rated}_M$ is a rated value of the first power source 520, and $\text{Rated}_S$ is a rated value of the second power source 522. Here, the current value is the effective value of the current outputted from the inverter unit. The voltage value is the effective value of the voltage outputted from the inverter unit. Since the current limit value is thus updated in step 616 and step 617, the output current value I2 of the second power source 522 always becomes smaller than the load current value IL. Therefore, in the present embodiment, the second power source 522 does not operate in the constant voltage mode. In Expression (1), the sum (I1+I2) of I1 and I2 represents the value of the load current outputted from the AC voltage supply system 500. The value multiplied with the sum is a value that is not smaller than 0 and is smaller than 1. This value is a target value determined by the rated values of the first power source 520 and the second power source 522. Expression (1) can also be construed as making the ratio of the current limit value $I_{TS}$ to the current value (I1+I2) supplied from the voltage supply system 500, equal to a value that is not smaller than 0 and is smaller than 1.

In addition, by resetting the second target voltage to the present output voltage of the second power source 522 in step 614, the second target voltage for the second power source 522 becomes smaller than the initial value of the second target voltage, as described in the first modification of the first embodiment.

In the present embodiment, I1 represents the value of the load current outputted from the first power source 520. However, this disclosure is not limited to such an embodiment. As I1, any value may be used as long as the value serves as a reference for estimating or calculating the value of the load current to be outputted from the second power source 522. For example, IL outputted from the AC voltage supply system 500 may be used as I1. In this case, a voltage sensor may be provided to the connection line 506 shown in FIG. 15.

[Operation of AC Voltage Supply System]

The AC voltage supply system 500 described above operates as follows. At the start of operation of the AC voltage supply system 500, operation of the second power source 522 is prohibited. Only the first power source 520 operates, and the second power source 522 does not operate. The first power source 520 initially reads the first target voltage from the target voltage storage unit 558, and thereafter, operates by constant voltage control in the same manner as the first power source 104, except that the output is AC, instead of DC. At this time, the power source internal control unit 552 of the first power source 520 receives the load current value measured by the current sensor 554, from the A/D conversion circuit 556, and transmits the load current value to the second power source 522 via the bus 524 at regular intervals.

Until the predetermined period elapses from the start of the second power source 522, the operation prohibition signal generation circuit 586 provides the operation prohibition signal to the power source internal control unit 582. The power source internal control unit 582 does not drive the inverter unit 580, and no current is outputted from the second power source 522.

When the predetermined period has elapsed, the timer 584 detects the elapse and transmits a timer expiration signal to the operation prohibition signal generation circuit 586. In response to the timer expiration signal, the operation prohibition signal generation circuit 586 stops output of the operation prohibition signal. As a result, current output from the second power source 522 under control by the power source internal control unit 582 is started (step 602 and subsequent steps in FIG. 18). Since the second target voltage for the second power source 522 is set to be greater than the first target voltage for the first power source 520, the second power source 522 can start current output.

The power source internal control unit 582 of the second power source 522 sets the initial value of the second target voltage (step 602). Specifically, the power source internal control unit 582 reads the initial target voltage from the initial target voltage storage unit 590 and stores the initial target voltage in the target voltage storage unit 592. This initial value has been stored in the initial target voltage storage unit 590 in FIG. 17. This initial value is set to be slightly greater than the first target voltage for the constant voltage control of the first power source 520. For example, if the first target voltage is 15 V, the second target voltage is set to about 18 V. The second target voltage is updated along with operation of the second power source 522 as described later.

The power source internal control unit 582 further sets the initial value of the current limit value (step 604). Specifically, the power source internal control unit 582 reads the initial value of the current limit value from the initial current limit value storage unit 594, and stores the initial value in the current limit value storage unit 596. The current limit value is also to be updated as described later. Subsequently, the power source internal control unit 582 determines the current limit value $I_{TS}$ for the second power source 522, using the above Expression (1), on the basis of the preset rated values $Rated_M$ and $Rated_S$ (output currents) of the first power source 520 and the second power source 522, the output current value I1 of the first power source 520 transmitted from the power source internal control unit 552 of the first power source 520, and the own output current value I2 (step 606). Thereafter, arbitration is performed between the control variable of the constant voltage control performed with the second target voltage and the control variable of the constant current control based on the current limit value $I_{TS}$ determined by the above Expression (1) (step 608). Here, the control variable of the constant current control is selected. Then, the selected control variable is outputted, and the inverter unit 580 is driven by a control signal according to this control variable.

Further, the second target voltage is replaced with the present output voltage of the second power source 522 (step 614). The output voltage VL of the AC voltage supply system 500 is determined by the output voltage V1 of the first power source 520 which is operating in the constant voltage mode. The output voltage VL of the AC voltage supply system 500 becomes a value obtained by subtracting the voltage drop due to the parasitic resistance 528 from the output voltage V2 of the second power source 522. Therefore, by updating the second target voltage as described above, the second target voltage becomes smaller than the initial value thereof.

Thereafter, the current limit value for the second power source 522 is updated in accordance with Expression (1). Through this update, the current limit value for the second power source 522 always becomes smaller than the load current value IL. The output current of the second power source 522 never becomes equal to or greater than the load current value IL, and the second power source 522 substantially operates only in the constant current mode. That is, in a state in which the output voltage of the second power source 522 is approaching to reach the second target voltage, the first power source 520 is not outputting a current and only the second power source 522 is outputting a current. In this state, there is a possibility of causing voltage change described as the problem of the conventional art. However, in the present embodiment, since the current limit value for the second power source 522 is updated in accordance with Expression (1), both of the first power source 520 and the second power source 522 always bear the load currents at a certain ratio, so that the above problem does not arise.

If a stop instruction is received (YES in step 612), the control proceeds to step 618 to perform stop processing, and thus execution of the program is ended.

As described above, according to the present embodiment, in the AC voltage supply system 500, the first power source 520 and the second power source 522 can be both operated and it is possible to prevent load concentration in which a current is supplied to the load 504 only from one power source. Current supply to the load 504 can be distributed between two power sources, whereby it is possible to prevent a state in which only a specific power source operates for a long time and the lives of the plurality of power sources become unequal.

In the present embodiment, when the second power source 522 starts to operate, the first power source 520 and the second power source 522 each bear a part of the load current and both operate. When the load current changes, switching between the load current region in which only the first power source 520 operates and the load current region in which the first power source 520 and the second power source 522 operate, does not occur. As a result, occurrence of voltage change due to such switching can be prevented.

Modifications

In the above embodiment, I1 represents the value of the load current outputted from the first power source 520. However, this disclosure is not limited to such an embodiment. As I1, any value may be used as long as the value serves as a reference for estimating or calculating the value of the load current to be outputted from the second power source 522. For example, IL outputted from the AC voltage supply system 500 may be used as I1. In this case, a voltage sensor may be provided to the connection line 506 shown in FIG. 15.

Alternatively, I1 may be a value representing the current on the input side of the first power source 520. In this case, as shown in FIG. 19, a current sensor 650 may be provided on the input side of a first power source 630.

Figure 19:
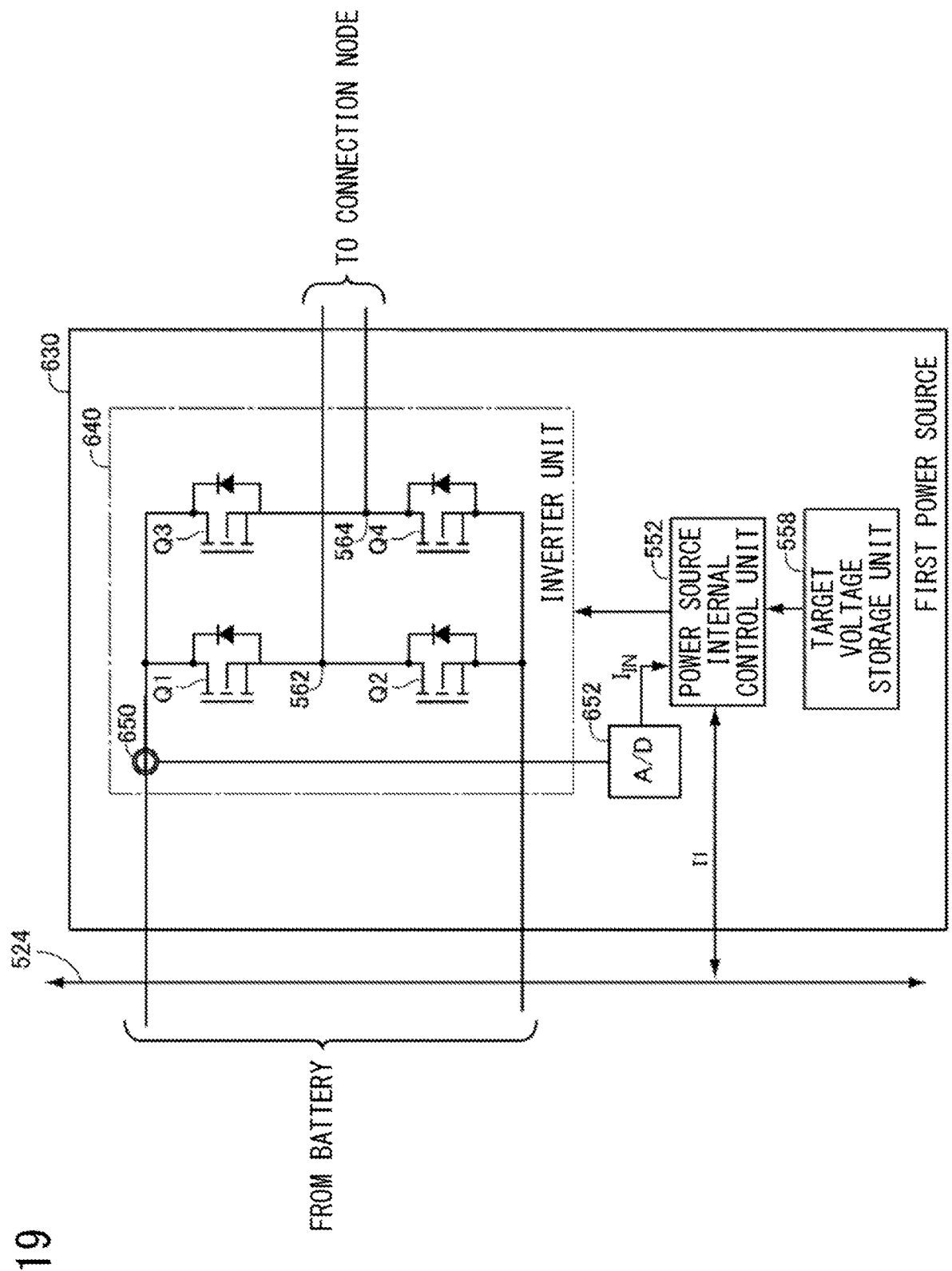
FIG. 19 is a block diagram showing the configuration of a first power source in a modification of the second embodiment.

The first power source 630 shown in FIG. 19 is different from the first power source 520 in that the first power source 630 includes, instead of the inverter unit 550 shown in FIG. 16, an inverter unit 640 having the current sensor 650 located on the input side, and includes, instead of the A/D conversion circuit 556 shown in FIG. 16, an A/D conversion circuit 652 which performs A/D conversion of an analog signal outputted from the current sensor 650 and provides the resultant signal to the power source internal control unit 552. In this case, it cannot be said that the current value measured by the current sensor 650 is the output current value of the first power source 630. However, the output current of the first power source 630 can be estimated on the basis of the output of the current sensor 650. For example, the output current of the first power source 630 can be estimated by the following expression.

[Mathematical 2]

$$I_{TS} = (C1^* I1 + I2) * \frac{\text{Rated}_S}{\text{Rated}_M + \text{Rated}_S}$$

It is noted that $I_{TS}$ is the current limit value for the second power source 522, I1 is a reference value and is the output of the current sensor 650 on the input side of the inverter unit 640 received from the first power source 630, C1 is a coefficient for estimating the output current of the first power source 630 from I1, I2 is the output of the current sensor shown in FIG. 17, $\text{Rated}_M$ is the rated value of the first power source 630 and $\text{Rated}_S$ is the rated value of the second power source 522.

The processing of estimating the output current value of the first power source 630 by multiplying the current value I1 which is the reference value by the coefficient C1, may be performed in the power source internal control unit 552. Unlike the configuration shown in FIG. 19, for example, in a case where a DC-DC unit for voltage conversion is provided at a stage preceding the inverter unit 640 or in a case where a transformer for voltage conversion is provided at a stage subsequent to the inverter unit 640, the output current of the first power source 630 can be estimated from a current measured at any part in such a configuration, using, for example, a step-down ratio of the transformer. The estimated output current of the first power source 630 may be transmitted from the power source internal control unit 552 to the second power source 522.

The value transmitted from the first power source 630 to the second power source 522 may not be the output current of the first power source 630. A value including information equivalent to the output current of the first power source 630 may be used. For example, the load rate (output current value/rated value) of the first power source 630 may be used, or information other than this may be used. In the case of the sensor arrangement as shown in FIG. 19, instead of the output current of the first power source 630 estimated by the power source internal control unit 552, the current value measured by the current sensor 650 may be transmitted to the second power source 522. In this case, the output current of the first power source 630 may be estimated on the second power source 522 side. If the circumstances permit, it is also possible that the analog signal outputted from the current sensor 650 is directly transmitted to the second power source 522, and the analog signal is converted to a digital signal and processed, on the second power source 522 side.

Third Embodiment

Figure 20:
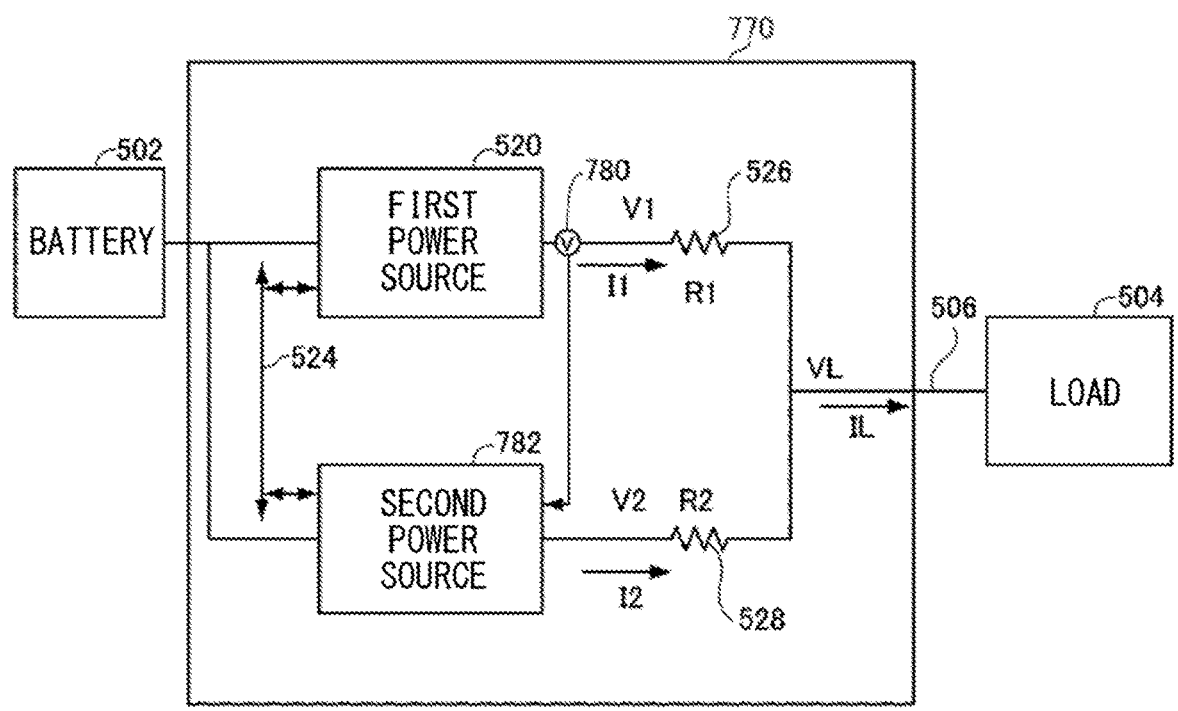
FIG. 20 is a block diagram showing the configuration of an AC voltage supply system according to the third embodiment.

FIG. 20 is a block diagram showing the configuration of an AC voltage supply system according to the third embodiment. With reference to FIG. 20, an AC voltage supply system 770 according to the present embodiment has a configuration similar to the AC voltage supply system 500 shown in FIG. 15, but is different from the AC voltage supply system 500 in that the AC voltage supply system 770 further includes a voltage sensor 780 which measures the output voltage of the first power source 520 in FIG. 15 and outputs an analog signal, and includes, instead of the second power source 522 in FIG. 15, a second power source 782 which receives the output of the voltage sensor 780 and as in the second power source 522, operates switchably between the constant voltage mode using a higher target voltage than the target voltage for the first power source 520, and the constant current mode based on the current limit value.

Figure 21:
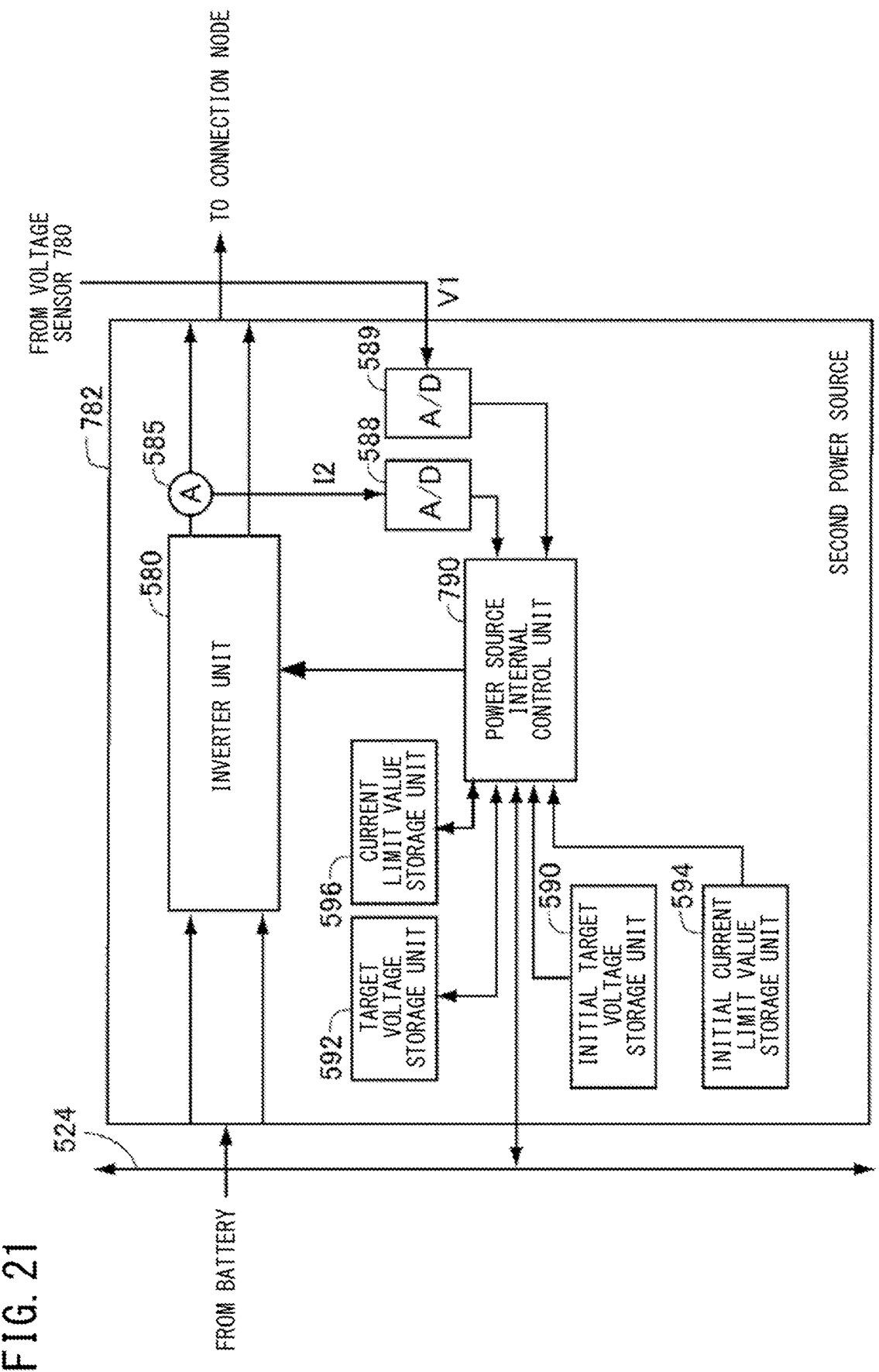
FIG. 21 is a block diagram showing the configuration of a second power source in the third embodiment.

With reference to FIG. 21, the second power source 782 is different from the second power source 522 shown in FIG. 17, as follows. The voltage sensor 587 is deleted from the second power source 522 shown in FIG. 17, and the A/D conversion circuit 589 receives the output of the voltage sensor 780 shown in FIG. 20, instead of the voltage sensor 587, performs A/D conversion, and outputs a digital signal. The second power source 782 does not include the timer 584 and the operation prohibition signal generation circuit 586 shown in FIG. 17. The second power source 782 includes, instead of the power source internal control unit 582 shown in FIG. 17, a power source internal control unit 790 which, after the AC voltage supply system 770 is started, stops the inverter unit 580 until the output voltage of the first power source 520 received from the voltage sensor 780 becomes equal to the first target voltage, and starts power conversion operation of the inverter unit 580 in response to the fact that the output voltage of the first power source 520 has become equal to the first target voltage. Except for the above, the second power source 782 has the same configuration as the second power source 522.

In the third embodiment, the power source internal control unit 790 stops a drive signal to the inverter unit 580 after the AC voltage supply system 770 is started. That is, although the power source internal control unit 790 calculates the value of the drive signal for the inverter unit 580 needed for outputting a current in the constant current mode, the power source internal control unit 790 opens a contact of an output switch for the drive signal to the inverter unit 580, so as not to output the drive signal. As a result, immediately after the AC voltage supply system 770 is started, the inverter unit 580 does not operate and current output from the second power source 782 is not performed. The power source internal control unit 790 monitors the output voltage V1 of the first power source 520 provided from the voltage sensor 780 via the A/D conversion circuit 589 in this state. If the output voltage V1 of the first power source 520 has become equal to the first target voltage, this means that power conversion in the first power source 520 is started. In this case, the power source internal control unit 790 starts to output the drive signal to the inverter unit 580. Since the target voltage for the second power source 782 in the constant voltage mode is greater than the first target voltage, the second power source 782 can output a current. On the other hand, the current limit value for the second power source 782 is determined so that the ratio of the current limit value to the sum of the output current of the first power source 520 and the output current of the second power source 782 satisfies Expression (1), as in each of the above embodiments. With this value, the second power source 782 operates in the constant current mode, and the current for the load is allocated between the first power source 520 and the second power source 782. The second power source 782 does not operate in the constant voltage mode, and voltage change due to changing of the operation mode from the constant voltage mode by the first power source 520 to the constant voltage mode by the second power source 782, can be prevented. As a result, it is possible to provide a voltage supply system and a power source that enable power sources to be set at desired load ratios. In addition, it is possible to suppress change in the output voltage of the voltage supply system due to change in the load current. In the present embodiment, start of power conversion in the first power source 520 is detected from the fact that the output voltage V1 of the first power source 520 has become equal to the first target voltage. However, this disclosure is not limited to such an embodiment. The first power source 520 itself may determine that the first power source 520 has started power conversion, and may transmit a signal indicating this, to the power source internal control unit 790.

Fourth Embodiment

The fourth embodiment relates to an AC voltage supply system which includes a first power source and a second power source and which converts a DC voltage from a battery to a predetermined AC voltage and outputs the AC voltage, as in the third embodiment.

Figure 22:
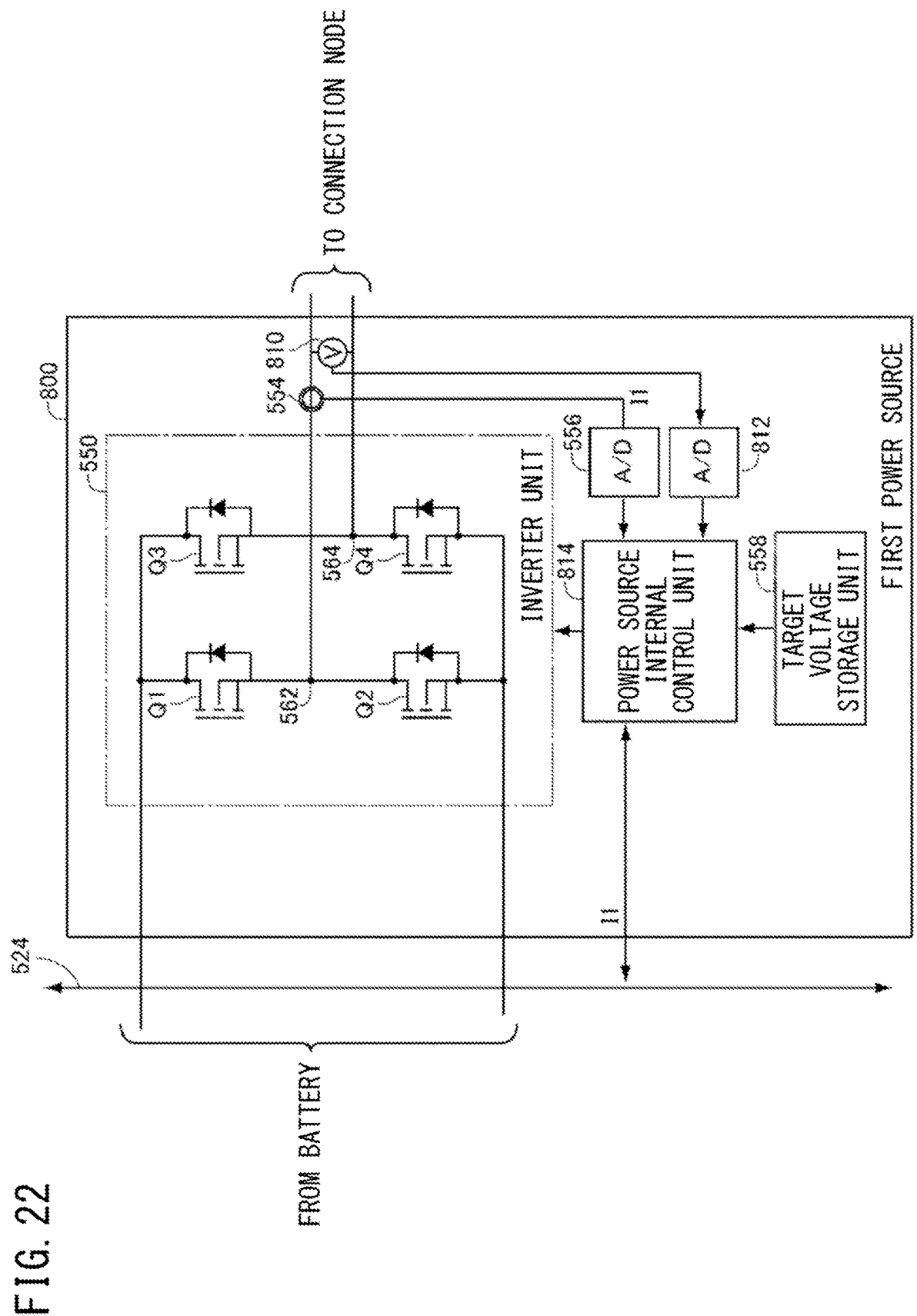
FIG. 22 is a block diagram showing the configuration of a first power source in the fourth embodiment.

FIG. 22 is a block diagram showing the configuration of a first power source 800 in the fourth embodiment. With reference to FIG. 22, the first power source 800 has a configuration similar to the first power source 520 shown in FIG. 16. The differences are that the first power source 800 further includes a voltage sensor 810 for measuring the output voltage of the inverter unit 550, and an A/D conversion circuit 812 for converting an analog voltage signal outputted from the voltage sensor 810, to a digital signal, and that the first power source 800 includes, instead of the power source internal control unit 552 in FIG. 16, a power source internal control unit 814 further having a function of outputting the signal indicating the output voltage of the inverter unit 550 provided from the A/D conversion circuit 812, to the bus 524.

Figure 23:
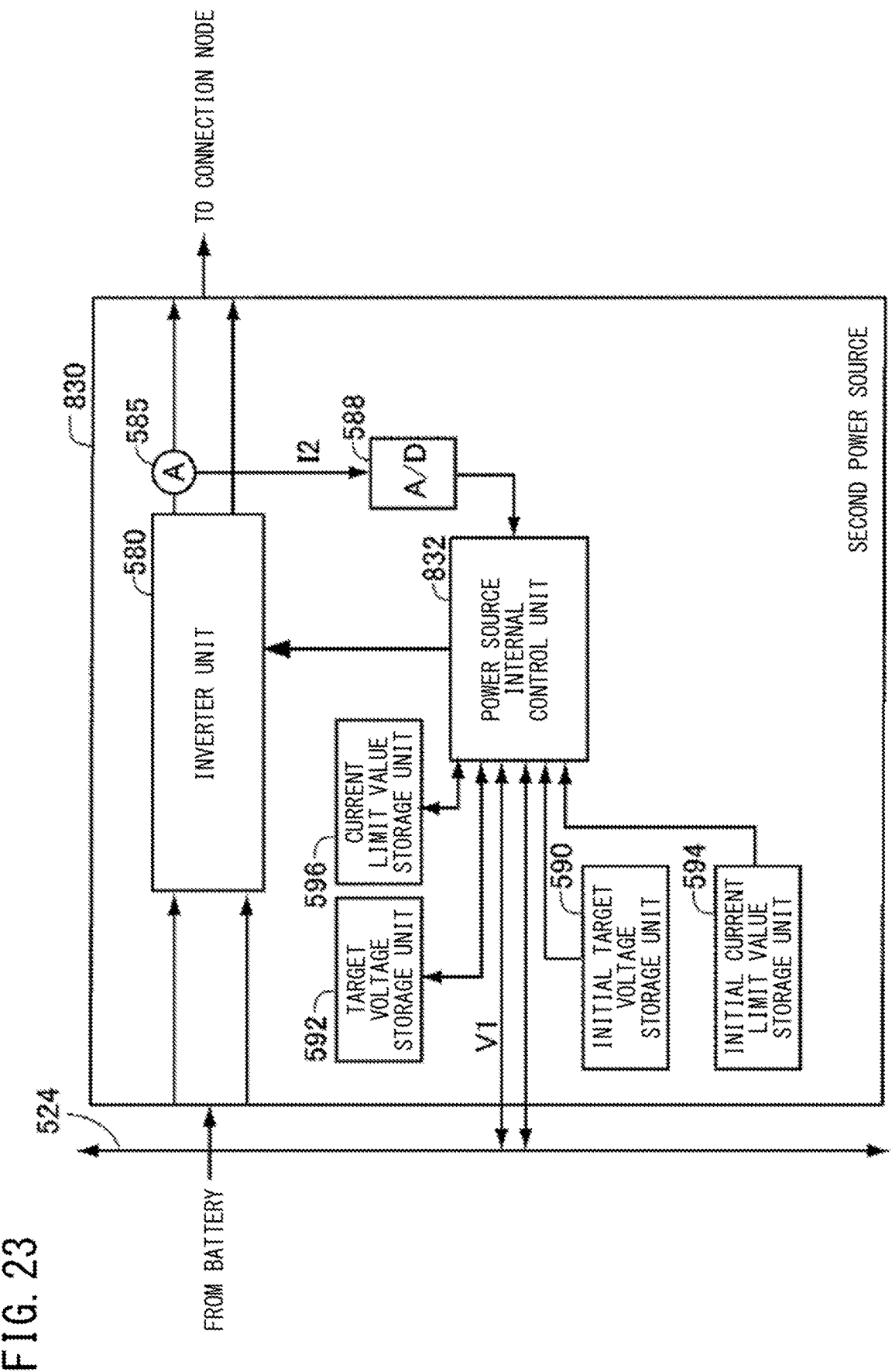
FIG. 23 is a block diagram showing the configuration of a second power source in the fourth embodiment.

FIG. 23 is a block diagram showing the configuration of the second power source 830 in the fourth embodiment. With reference to FIG. 23, the second power source 830 is different from the power source internal control unit 582 (see FIG. 17) of the third embodiment in that the second power source 830 does not include the A/D conversion circuit 589, the timer 584, and the operation prohibition signal generation circuit 586 shown in FIG. 17, and the second power source 830 includes, instead of the power source internal control unit 582 in FIG. 17, a power source internal control unit 832 which, after the start of the AC voltage supply system including the first power source 800 and the second power source 830, stops the inverter unit 580 until the output voltage of the first power source 800 received from the first power source 800 via the bus 524 becomes equal to the first target voltage, and starts power conversion operation of the inverter unit 580 in response to the fact that the output voltage of the first power source 800 has become equal to the first target voltage.

Operation of the AC voltage supply system according to the present embodiment is the same as that in the third embodiment. The power source internal control unit 832 stops a drive signal to the inverter unit 580 after the AC voltage supply system according to the present embodiment is started. That is, although the power source internal control unit 832 calculates the value of the drive signal for the inverter unit 580 needed for outputting a current in the constant current mode, the power source internal control unit 832 opens a contact of an output switch for the drive signal to the inverter unit 580, so as not to output the drive signal. As a result, immediately after the AC voltage supply system is started, the inverter unit 580 does not operate and current output from the second power source 830 is not performed. The power source internal control unit 832 monitors the output voltage V1 of the first power source 800 provided from the first power source 800 via the bus 524 in this state. If the output voltage V1 of the first power source 800 has become equal to the first target voltage, this means that power conversion in the first power source 800 is started. In this case, the power source internal control unit 832 starts to output the drive signal to the inverter unit 580. Since the target voltage for the second power source 830 in the constant voltage mode is greater than the first target voltage, the second power source 830 can output a current. On the other hand, the current limit value for the second power source 830 is determined so that the ratio of the current limit value to the sum of the output current of the first power source 800 and the output current of the second power source 830 satisfies Expression (1). With this value, the second power source 830 operates in the constant current mode, and the current for the load is allocated between the first power source 800 and the second power source 830. The second power source 830 does not operate in the constant voltage mode, and the operation mode does not change from the constant voltage mode by the first power source 800 to the constant voltage mode by the second power source 830. Thus, voltage change due to changing of the operation mode can be prevented. As a result, it is possible to provide a voltage supply system and a power source that enable power sources to be set at desired load ratios. In addition, it is possible to suppress change in the output voltage of the voltage supply system due to change in the load current. Also in the present embodiment, start of power conversion in the first power source 800 may be detected by the power source internal control unit 832 receiving a signal indicating that the first power source 800 is started, from the first power source 800.

The above description includes the features in the additional notes below.

(Additional note 1) ADC power source used in a DC voltage supply system including a constant voltage power source configured to output a DC voltage in a constant voltage mode on the basis of a first target voltage, the DC power source being connected in parallel to the constant voltage power source, the DC power source comprising a voltage generation unit configured to output a voltage switchably between a constant voltage mode based on a second target voltage greater than the first target voltage and a constant current mode based on a current limit value.

(Additional note 2) The DC power source according to additional note 1, wherein the current limit value is set at 0 during a predetermined period after the DC voltage supply system is started, and after the predetermined period has elapsed, the current limit value is set at a predetermined value greater than 0.

(Additional note 3) The DC power source according to additional note 1, wherein the current limit value is a value obtained by multiplying a current value of a current being supplied from the DC voltage supply system by a value not smaller than 0 and not greater than 1.

(Additional note 4) The DC power source according to any one of additional notes 1 to 3, wherein the second target voltage is a value greater than an upper limit of variation in the DC voltage outputted from the constant voltage power source on the basis of the first target voltage.

(Additional note 5) The DC power source according to any one of additional notes 1 to 3, wherein the second target voltage is a value equal to an upper limit of variation in the DC voltage outputted from the constant voltage power source on the basis of the first target voltage.

(Additional note 6) The DC power source according to any one of additional notes 1 to 5, wherein after the DC voltage supply system is started, if the voltage generation unit has begun to output a voltage in the constant current mode, the second target voltage is replaced with a voltage being outputted from the DC power source.

(Additional note 7) The DC power source according to any one of additional notes 1 to 6, further comprising a state detection unit configured to detect an operation state of the DC power source, wherein the current limit value is decreased to a value not smaller than 0, in response to a fact that the state detection unit has detected that the DC power source is not operating in the constant current mode.

(Additional note 8) The DC power source according to any one of additional notes 1 to 6, further comprising a measurement unit configured to measure an output current of the DC power source, wherein the current limit value is decreased to a value not smaller than 0, in response to a fact that the output current measured by the measurement unit has become smaller than the current limit value.

(Additional note 9) The DC power source according to any one of additional notes 1 to 8, further comprising a determination unit configured to determine whether or not the constant voltage power source is stopped, wherein in response to a fact that the determination unit has determined that the constant voltage power source is stopped, the second target voltage is replaced with the first target voltage, and the current limit value is replaced with a rated maximum current value of the DC power source.

(Additional note 10)

A DC voltage supply system comprising:

a first power source configured to output a DC voltage in a constant voltage mode on the basis of a first target voltage; and a second power source connected in parallel to the first power source, wherein the second power source includes a voltage generation unit configured to output a voltage switchably between a constant voltage mode based on a second target voltage greater than the first target voltage and a constant current mode based on a current limit value.

(Additional note 11)

A power source control device used in a voltage supply system including a constant voltage power source configured to output a voltage in a constant voltage mode on the basis of a first target voltage, the power source control device configured to control a power source connected in parallel to the constant voltage power source, the power source being a power conversion circuit configured to convert an input voltage to a predetermined output voltage and output the converted output voltage, the power conversion circuit including a plurality of switching elements connected so as to convert the input voltage to the output voltage and output the converted output voltage, the power source control device comprising:

a current sensor configured to measure an output current of the power conversion circuit;

a voltage sensor configured to measure the output voltage of the power conversion circuit;

a timer configured to, after start of the voltage supply system, detect that a predetermined period has elapsed, and output a detection signal; and a computer configured to receive outputs of the current sensor and the timer and have an output for driving the plurality of switching elements, wherein the computer is programmed to keep the power conversion circuit in a stopped state when the voltage supply system is started, in response to the detection signal from the timer, determine an initial value of a current limit value for the power conversion circuit and start the power conversion circuit, and repeatedly execute the following control process, and in the control process, the computer is programmed to drive the power conversion circuit so that a current corresponding to the current limit value is obtained at an output of the power conversion circuit, and update the current limit value by applying a predetermined calculation expression with respect to the output of the current sensor, and an output current of the voltage supply system or an output current of the constant voltage power source.

(Additional note 12)

The power source control device according to additional note 11, wherein the computer is connected so as to receive, from the constant voltage power source, a reference value for calculating the output current of the constant voltage power source, and the computer is programmed to, when updating the current limit value in the control process, apply the calculation expression with respect to the output of the current sensor and the reference value and thereby update the current limit value.

(Additional note 13)

The power source control device according to additional note 12, wherein the calculation expression is the following expression:

[Mathematical 3]

$$I_{TS} = (I1 + I2) * \frac{Rated_S}{Rated_M + Rated_S}$$

where $I_{TS}$ is the current limit value, I1 is the reference value, I2 is the output of the current sensor, $Rated_M$ is a rated value of the constant voltage power source, and $Rated_S$ is a rated value of the power conversion circuit.

(Additional note 14)

The power source control device according to additional note 12, wherein the calculation expression is the following expression:

[Mathematical 4]

$$I_{TS} = (C1*I1 + I2) * \frac{Rated_S}{Rated_M + Rated_S}$$

wherein $I_{TS}$ is the current limit value, I1 is the reference value, C1 is a coefficient for estimating the output current of the constant voltage power source from the reference value, I2 is the output of the current sensor, $Rated_M$ is a rated value of the constant voltage power source, and $Rated_S$ is a rated value of the power conversion circuit.

(Additional note 15)

The power source control device according to any one of additional notes 11 to 14, wherein the computer includes a memory, the computer is programmed to in response to a fact that the power conversion circuit is started, store, in the memory, an initial value of a second target voltage which is a target value for the output voltage of the power conversion circuit, the second target voltage being greater than the first target voltage which is a target value for the output voltage of the constant voltage power source, and in the control process, the computer is further programmed to control the power conversion circuit so that the output voltage of the power conversion circuit does not exceed the second target voltage stored in the memory, and update the second target voltage stored in the memory, by an output value of the voltage sensor after the power conversion circuit is controlled.

While this disclosure has been described through description of embodiments above, the above embodiments are merely illustrative and this disclosure is not limited to only the above embodiments. The scope of the present invention is defined by each claim of the scope of claims with reference to the above description, and includes meanings equivalent to the wordings described therein and all modifications within the scope of claims.

REFERENCE SIGNS LIST 100, 130, 140 DC voltage supply system
102, 502 battery
104, 520, 630, 800 first power source
106, 132, 522, 782, 830 second power source
108 control unit
110, 504 load
112, 114, 526, 528 parasitic resistance
116 connection node
120 CPU
122 memory
124, 154 IF unit
126, 524 bus
134 voltmeter
142 ammeter
144 current value transmission line
150 DC-DC unit
152, 552, 582, 790, 814, 832 power source internal control unit
200 rectangle
202, 204 circle
300, 302, 304, 306, 308, 400, 402, 404, 406, 408, 410, 420, 600, 602, 604, 606, 608, 610, 612, 613, 614, 615, 616, 617, 618 step
500, 770 AC voltage supply system
506 connection line
550, 580, 640 inverter unit
554, 585, 650 current sensor
556, 588, 589, 652, 812 A/D conversion circuit
558, 592 target voltage storage unit
562, 564 node
584 timer
586 operation prohibition signal generation circuit
587, 810 voltage sensor
590 initial target voltage storage unit
594 initial current limit value storage unit
596 current limit value storage unit
C1 coefficient
Q1, Q2, Q3, Q4 switching element
R1, R2 resistance value
V1 output voltage of first power source
V2 output voltage of second power source
VL output voltage of voltage supply system
I1 output current of first power source
I2 output current of second power source
IL output current of voltage supply system

The invention claimed is:

1. A power source used in a voltage supply system including a constant voltage power source configured to output a voltage in a constant voltage mode on the basis of a first target voltage, the power source being connected in parallel to the constant voltage power source, the power source comprising:

a voltage generation unit configured to output a voltage switchably between a constant voltage mode based on a second target voltage greater than the first target voltage and a constant current mode based on a current limit value; and a delay unit configured to delay start of power conversion in the power source until the constant voltage power source starts power conversion.

2. The power source according to claim 1, wherein the delay unit includes a delayed starting unit configured to start power conversion in the power source with a delay of a predetermined period after the voltage supply system is started.

3. The power source according to claim 2, wherein the delayed starting unit includes a timer configured to detect that the predetermined period has elapsed after the voltage supply system is started, an operation prohibition unit configured to prohibit operation of the power source in response to a fact that the voltage supply system is started, and a starting unit configured to, in response to a fact that the timer has detected elapse of the predetermined period, disable the operation prohibition unit and start power conversion in the power source.

4. The power source according to claim 3, wherein the operation prohibition unit includes a first current setting unit configured to set the current limit value at 0 in response to a fact that the voltage supply system is started, and the starting unit includes a second current setting unit configured to set the current limit value to a predetermined value greater than 0 in response to a fact that the timer has detected elapse of the predetermined period.

5. The power source according to claim 4, wherein the second current setting unit includes a limit value setting unit configured to set the current limit value at a value between a predetermined lower limit value and an upper limit value prescribed by a current value of a current being supplied from the voltage supply system.

6. The power source according to claim 5, wherein the limit value setting unit includes a current limit value determining unit configured to determine the current limit value to be a value obtained by multiplying the current value of the current being supplied from the voltage supply system by a value that is not smaller than 0 and is smaller than 1.

7. The power source according to claim 5, wherein the limit value setting unit includes a setting unit configured to set the current limit value so that a ratio of the current limit value to the current value of the current being supplied from the voltage supply system becomes equal to a predetermined target value that is not smaller than 0 and is smaller than 1.

8. The power source according to claim 5, wherein the second current setting unit includes a current value reception unit configured to receive, from the constant voltage power source, a value indicating a current value of a current being outputted from the constant voltage power source, and the limit value setting unit is configured to set the current limit value so that a ratio of the current limit value to a sum of the current value indicated by the value received by the current value reception unit and a current value of a current being outputted from the power source becomes a predetermined target value that is not smaller than 0 and is smaller than 1.

9. The power source according to claim 8, wherein the limit value setting unit includes a current value calculation unit configured to calculate the current value of the current being outputted from the constant voltage power source by a predetermined conversion expression with respect to the value received by the current value reception unit, and a current limiting unit configured to set the current limit value so that a ratio of the current limit value to a sum of the current value calculated by the current value calculation unit and the output current value of the power source becomes the target value.

10. The power source according to claim 8, wherein the target value is a ratio of a rated output current of the power source to a sum of a rated output current of the constant voltage power source and the rated output current of the power source.

11. The power source according to claim 4, further comprising a current value reception unit configured to receive a signal indicating a current value of a current being supplied from the voltage supply system, wherein the second current setting unit includes a current limit value setting unit configured to set the current limit value at a value between a predetermined lower limit value and the current value indicated by the signal received by the current value reception unit.

12. The power source according to claim 11, further comprising a current sensor configured to measure the current value of the current being supplied from the voltage supply system to a load, wherein the current value reception unit receives the signal indicating the current value from the current sensor.

13. The power source according to claim 11, wherein the voltage supply system further includes a current sensor configured to measure the current value of the current being supplied from the voltage supply system to a load, and a control unit configured to supply a signal indicating the current value measured by the current sensor, to the current value reception unit, and the current value reception unit receives the signal from the control unit.

14. The power source according to claim 4, further comprising a current value reception unit configured to receive a current value of a current being outputted from the constant voltage power source, wherein the second current setting unit includes a current limit value setting unit configured to set the current limit value so that a ratio of the current limit value to the current value received by the current value reception unit becomes a predetermined target value.

15. The power source according to claim 14, further comprising:

a current sensor configured to measure the current value of the current being outputted from the constant voltage power source; and a control unit configured to supply a signal indicating the current value measured by the current sensor, to the current value reception unit, wherein the current value reception unit receives the signal from the control unit.

16. The power source according to claim 14, further comprising a current sensor configured to measure the current value of the current being outputted from the constant voltage power source, wherein the current value reception unit receives the current value from the current sensor.

17. The power source according to claim 3, wherein the operation prohibition unit includes a drive signal stop unit configured to stop output of a drive signal to the voltage generation unit in response to a fact that the voltage supply system is started, and the starting unit includes a drive signal output unit configured to start output of the drive signal to the voltage generation unit in response to a fact that the timer has detected elapse of the predetermined period.

18. The power source according to claim 2, wherein the delayed starting unit includes a timer configured to detect that the predetermined period has elapsed after the voltage supply system is started, a drive signal output stop unit configured to stop output of a drive signal to the voltage generation unit in response to a fact that the voltage supply system is started, and a starting unit configured to start power conversion in the power source by disabling the drive signal output stop unit in response to a fact that the timer has detected elapse of the predetermined period.

19. The power source according to claim 1, wherein the delay unit includes a delayed starting unit configured to start power conversion in the power source in response to a fact that power conversion in the constant voltage power source is started.

20. The power source according to claim 19, wherein the delayed starting unit starts power conversion in the power source in response to at least one of a fact that the output voltage of the constant voltage power source has reached the first target voltage and a fact that information indicating that power conversion is started is received from the constant voltage power source.

21. The power source according to claim 1, further comprising a determination unit configured to determine whether or not the constant voltage power source is stopped, wherein in response to a fact that the determination unit has determined that the constant voltage power source is stopped, the second target voltage is replaced with the first target voltage and the current limit value is replaced with a rated maximum current value of the power source.

22. The power source according to claim 1, wherein the constant voltage power source includes a DC constant voltage power source configured to output a DC voltage in the constant voltage mode on the basis of the first target voltage, the power source comprising a DC voltage generation unit configured to output a DC voltage switchably between the constant voltage mode and the constant current mode.

23. The power source according to claim 1, wherein the constant voltage power source includes an AC constant voltage power source configured to output an AC voltage in the constant voltage mode on the basis of the first target voltage, the power source comprising an AC voltage generation unit configured to output an AC voltage switchably between the constant voltage mode and the constant current mode.

24. A power source used in a voltage supply system including a constant voltage power source configured to output a voltage in a constant voltage mode on the basis of a first target voltage, the power source being connected in parallel to the constant voltage power source, the power source comprising:

a voltage generation unit configured to output a voltage switchably between a constant voltage mode based on a second target voltage greater than the first target voltage and a constant current mode based on a current limit value, wherein the second target voltage is a value not smaller than an upper limit of variation in the voltage outputted from the constant voltage power source on the basis of the first target voltage.

25. The power source according to claim 24, wherein the second target voltage is a value equal to an upper limit of variation in the voltage outputted from the constant voltage power source on the basis of the first target voltage.

26. The power source according to claim 24, wherein the variation is a value determined by specifications of the constant voltage power source.

27. A power source used in a voltage supply system including a constant voltage power source configured to output a voltage in a constant voltage mode on the basis of a first target voltage, the power source being connected in parallel to the constant voltage power source, the power source comprising:

a voltage generation unit configured to output a voltage switchably between a constant voltage mode based on a second target voltage greater than the first target voltage and a constant current mode based on a current limit value; and a target voltage replacement unit configured to replace the second target voltage with a voltage being outputted from the power source, in response to a fact that the voltage generation unit has begun to output the voltage in the constant current mode, after the voltage supply system is started.

28. A power source used in a voltage supply system including a constant voltage power source configured to output a voltage in a constant voltage mode on the basis of a first target voltage, the power source being connected in parallel to the constant voltage power source, the power source comprising:

a voltage generation unit configured to output a voltage switchably between a constant voltage mode based on a second target voltage greater than the first target voltage and a constant current mode based on a current limit value;

a state detection unit configured to detect an operation state of the power source; and a limiting unit configured to limit operation of the power source in response to a fact that the state detection unit has detected that the power source is operating in the constant voltage mode.

29. The power source according to claim 28, wherein the state detection unit detects whether or not the power source is operating in the constant voltage mode, on the basis of whether or not the output voltage of the power source has reached the second target voltage.

30. The power source according to claim 28, wherein the limiting unit decreases the current limit value to a value not smaller than 0, in response to a fact that the state detection unit has detected that the power source is operating in the constant voltage mode.

31. A power source used in a voltage supply system including a constant voltage power source configured to output a voltage in a constant voltage mode on the basis of a first target voltage, the power source being connected in parallel to the constant voltage power source, the power source comprising:

a voltage generation unit configured to output a voltage switchably between a constant voltage mode based on a second target voltage greater than the first target voltage and a constant current mode based on a current limit value; and a measurement unit configured to measure an output current of the power source, wherein the current limit value is decreased to a value not smaller than 0, in response to a fact that the output current measured by the measurement unit has become smaller than the current limit value.

32. A voltage supply system comprising:
a first power source configured to output a voltage in a constant voltage mode on the basis of a first target voltage; and
a second power source connected in parallel to the first power source, wherein
the second power source includes
    a voltage generation unit configured to output a voltage switchably between a constant voltage mode based on a second target voltage greater than the first target voltage and a constant current mode based on a current limit value, and
    a delay unit configured to delay start of power conversion in the second power source until the first power source starts power conversion.

\* \* \* \* \*